US009277412B2

(12) United States Patent
Freda et al.

(10) Patent No.: US 9,277,412 B2
(45) Date of Patent: Mar. 1, 2016

(54) COORDINATION OF SILENT PERIODS FOR DYNAMIC SPECTRUM MANAGER (DSM)

(75) Inventors: Martino M. Freda, Laval (CA); Alpaslan Demir, East Meadow, NY (US); Amith V. Chincholi, West Babylon, NY (US); Alexander Reznik, Titusville, NJ (US); Joseph A. Kwak, Bolingbrook, IL (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 253 days.

(21) Appl. No.: 13/510,228

(22) PCT Filed: Nov. 15, 2010

(86) PCT No.: PCT/US2010/056738
§ 371 (c)(1),
(2), (4) Date: Sep. 6, 2012

(87) PCT Pub. No.: WO2011/060376
PCT Pub. Date: May 19, 2011

(65) Prior Publication Data
US 2012/0320741 A1 Dec. 20, 2012

Related U.S. Application Data

(60) Provisional application No. 61/261,688, filed on Nov. 16, 2009, provisional application No. 61/267,914, filed on Dec. 9, 2009, provisional application No. 61/386,224, filed on Sep. 24, 2010.

(51) Int. Cl.
H04W 28/02 (2009.01)
H04W 24/10 (2009.01)
(Continued)

(52) U.S. Cl.
CPC .............. *H04W 16/14* (2013.01); *H04W 24/10* (2013.01); *H04W 72/082* (2013.01)

(58) Field of Classification Search
CPC .... H04W 16/14; H04W 72/082; H04W 24/10
USPC .......................................................... 370/229
See application file for complete search history.

(56) References Cited

U.S. PATENT DOCUMENTS 6,445,917 B1 9/2002 Bark et al.
8,107,391 B2 * 1/2012 Wu et al. ........................ 370/252
(Continued)

FOREIGN PATENT DOCUMENTS

CN 101390424 A 3/2009
JP 2003500909 A 1/2003
(Continued)

OTHER PUBLICATIONS

Cordiero, "Quiet Period Management in Wireless Networks", WO 2008/0090509 A1, Jul. 31 2008, Same as Document N.*
(Continued)

*Primary Examiner* — Andrew Lai
*Assistant Examiner* — Albert Shih
(74) *Attorney, Agent, or Firm* — Condo Roccia Koptiw LLP

(57) ABSTRACT

A method for use in a Dynamic Spectrum Manager (DSM) for coordinating asynchronous silent periods in a network, the method comprising detecting a primary user in the network, transmitting a Silent Period Start Control Message to one or more cognitive radio (CR) nodes in the network, wherein the message indicates the start and duration of a silent period and initiates spectrum sensing, receiving a Measurement Report Control Message from the one or more CR nodes in the network indicating results of spectrum sensing, and transmitting a message to the one or more CR nodes, wherein the message instructs the one or more CR nodes to move to a different frequency based on the spectrum sensing results.

21 Claims, 21 Drawing Sheets

(51) Int. Cl.
*H04W 16/14* (2009.01)
*H04W 72/08* (2009.01)

(56) References Cited

U.S. PATENT DOCUMENTS

| | | | |
|---|---|---|---|
| 2003/0178984 A1* | 9/2003 | Lansford et al. | 324/132 |
| 2005/0164724 A1 | 7/2005 | Marinier et al. | |
| 2008/0090581 A1 | 4/2008 | Hu | |
| 2009/0247201 A1 | 10/2009 | Ye et al. | |
| 2009/0252134 A1 | 10/2009 | Schlicht et al. | |
| 2009/0268619 A1 | 10/2009 | Dain et al. | |
| 2010/0061315 A1* | 3/2010 | Cordeiro | 370/329 |
| 2011/0199965 A1 | 8/2011 | Ariyoshi et al. | |

FOREIGN PATENT DOCUMENTS

| | | | |
|---|---|---|---|
| JP | 2003509982 A | 3/2003 | |
| JP | 2009-527972 A | 7/2009 | |
| WO | WO-0120942 A1 | 3/2001 | |
| WO | WO-03090509 A2 | 11/2003 | |
| WO | 2007/096819 | 8/2007 | |
| WO | 2008010168 A2 | 1/2008 | |
| WO | 2008038207 A2 | 4/2008 | |
| WO | 2008/090509 | 7/2008 | |
| WO | WO2008090509 A2 * | 7/2008 | H04L 12/56 |
| WO | 2009/045646 | 4/2009 | |
| WO | 2009069069 A2 | 6/2009 | |
| WO | 2009072087 A1 | 6/2009 | |
| WO | WO-2009084465 A1 | 7/2009 | |

OTHER PUBLICATIONS

Akyildiz et al., "CRAHNS: Cognitive Radio Ad Hoc Networks," Ad Hoc Networks, Elsevier, vol. 7, No. 5, pp. 810-836 (Jul. 2009).

Hoang et al., "Adaptive Scheduling of Spectrum Sensing Periods in Cognitive Radio Networks," IEEE Global Telecommunications Conference, pp. 3128-3132 (Nov. 2007).

IEEE P802.22/Draft 1.0; Draft Standard for Wireless Regional Area Networks Part 22: Cognitive Wireless RAN Medium Access Control (MAC) and Physical Layer (PHY) specifications: Policies and procedures for operation in the TV Bands (2006).

IEEE Standard for Information Technology—Telecommunications and information exchange between systems: Wireless Ragional Area Networks (WRAN)—Spesific Requirements; Part 22: Cognitive Wireless RAN Medium Access Control (MAC) and Physiscal Layer (PHY) Specifications: Policies and Procedures for Operation in the TV Bands, IEEE Std 802.22-11 (Jul. 2011).

Ileri et al., "Dynamic Spectrum Access Models: Toward an Engineering Perspective in the Spectrum Debate," IEEE Communications Magazine, vol. 46, No. 1, pp. 153-160 (Jan. 2008).

Institute of Electrical and Electronics Engineers, Inc. (IEEE), P802.22™/ DRAFTv2.0, "Draft Standard for Wireless Regional Area Networks Part 22: Cognitive Wireless RAN Medium Access Control (MAC) and Physical Layer (PHY) specifications: Policies and procedures for operation in the TV Bands", pp. 1-516, May 2009.

* cited by examiner

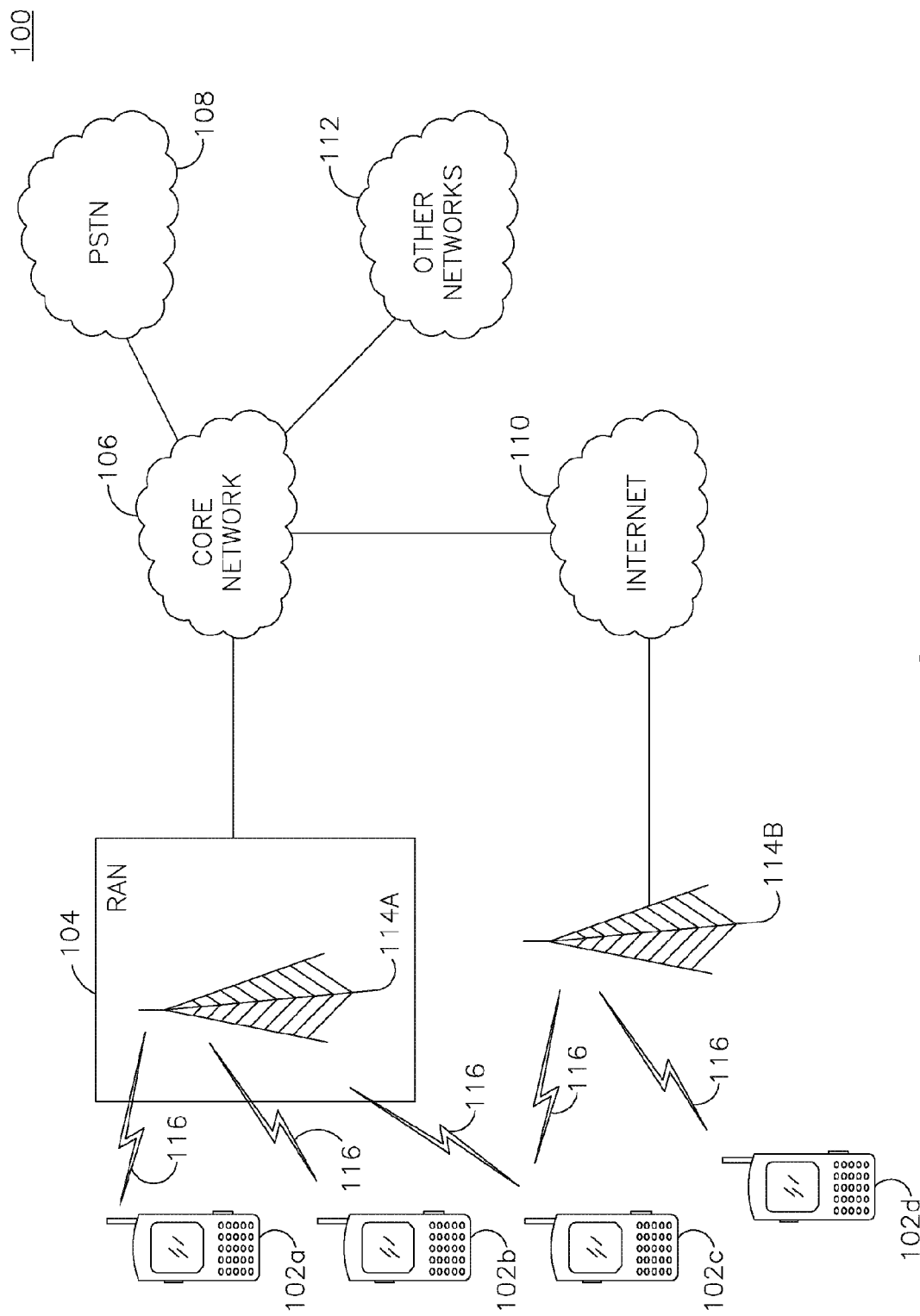

COORDINATION OF SILENT PERIODS FOR DYNAMIC SPECTRUM MANAGER (DSM)

CROSS REFERENCE TO RELATED APPLICATIONS

This application claims priority to the International Application No. PCT/US2010/056738 filed Nov. 26, 2010, which claims the benefit of U.S Provisional Application No's 61/261,688 filed Nov. 16, 2009, 61/267,914 filed Dec. 9, 2009, and 61/386,224 filed Sept. 24, 2010, the contents of which are hereby incorporated by reference herein.

BACKGROUND

The need for higher bandwidth efficiency for emerging networking technologies and the fact that today's licensed bandwidth is inefficiently utilized has lead to the development of technologies in cognitive radios (CR). A CR-enabled device is able to communicate on bands licensed to other devices by performing a spectrum sensing operation to find available spectrum at a particular instant and using the available spectrum at times where it may not be occupied by the primary user. In order to ensure that CR networks may coexist with current licensed technologies, CR devices may require a high degree of agility, (ability to quickly detect the presence of a primary user and react to the arrival of a primary user), in order to sense the arrival of a primary user on a band and to move to another available band without causing interference to the primary user.

Cooperative spectrum sensing may be used to decrease the sensitivity requirements of the spectrum sensing algorithm for a CR node which may be in a deep fading environment. In the most traditional form of cooperative spectrum sensing, a set of CR nodes may perform spectrum sensing simultaneously and transmit the individual results to a central node to determine the spectrum availability. This requires a method for coordinating and exchanging the spectrum sensing between users.

The simplest form of spectrum sensing algorithm may be the category of energy detection. This category of algorithms detects the presence or absence of a primary user by a measure of the energy detected on the particular band of interest. The simplicity of this form of spectrum sensing makes it highly attractive for the CR application. For example, the IEEE 802.22 standard for wireless regional area networks (WRANs) made energy detection using white spaces in the TV spectrum one of the accepted spectrum sensing techniques. A major challenge using energy detection for the CR device is to distinguish between a primary user transmission and another CR device transmission when performing the spectrum sensing. In addition, for cost reasons, a CR device may contain only one receiver and may not be able to perform spectrum sensing simultaneously with normal transmit (TX) receive (RX) operations. The resulting scenario where many CR devices form an ad-hoc or CR network and may coexist, spectrum sensing periods for each of these nodes need to be coordinated in time to ensure that the spectrum sensing is performed when no other CR nodes in the vicinity are transmitting. This leads to what is called a silent period for spectrum sensing.

The use of silent measurement periods in a network was explored for wireless access points (AP) needing to perform measurements on an allowable channel set. This previous work does not address the needs of a CR network trying to perform spectrum sensing in an environment with different primary users using differing wireless technologies. For example, the silent measurement period (SMP) requested by an AP may only be initiated when the communication medium becomes available, which may not address the agility requirements of a CR device. The CR device may react to the arrival of a primary user by switching to an unused band in a limited delay not to incur any interference to the primary user.

For example, the IEEE 802.22 draft standard requires an evacuation time of two seconds. This is the time required for a secondary user to leave the currently used band following the arrival of a licensed primary user to that band. Typically, periodic spectrum sensing periods have been considered, which require the CR nodes to perform spectrum sensing at least every two seconds to be able to achieve the required evacuation time. In general, periodic spectrum sensing may result in higher overhead in the CR node due to context switching, maintaining of buffers and real-time traffic during the spectrum sensing times. As a result, short spectrum sensing periods are highly undesirable from an efficiency perspective. Accordingly a method for coordinating silent periods for spectrum sensing in a CR network is needed.

SUMMARY

A method for use in a Dynamic Spectrum Manager (DSM) for coordinating asynchronous silent periods in a network, the method comprising detecting a primary user in the network, transmitting a Silent Period Start Control Message to one or more cognitive radio (CR) nodes in the network, wherein the message indicates the start and duration of a silent period and initiates spectrum sensing, receiving a Measurement Report Control Message from the one or more CR nodes in the network indicating results of spectrum sensing, and transmitting a message to the one or more CR nodes, wherein the message instructs the one or more CR nodes to move to a different frequency based on the spectrum sensing results.

BRIEF DESCRIPTION OF THE DRAWINGS

A more detailed understanding may be had from the following description, given by way of example in conjunction with the accompanying drawings wherein:

FIG. 1A is a system diagram of an example communications system in which one or more disclosed embodiments may be implemented;

DETAILED DESCRIPTION

Figure 1B:
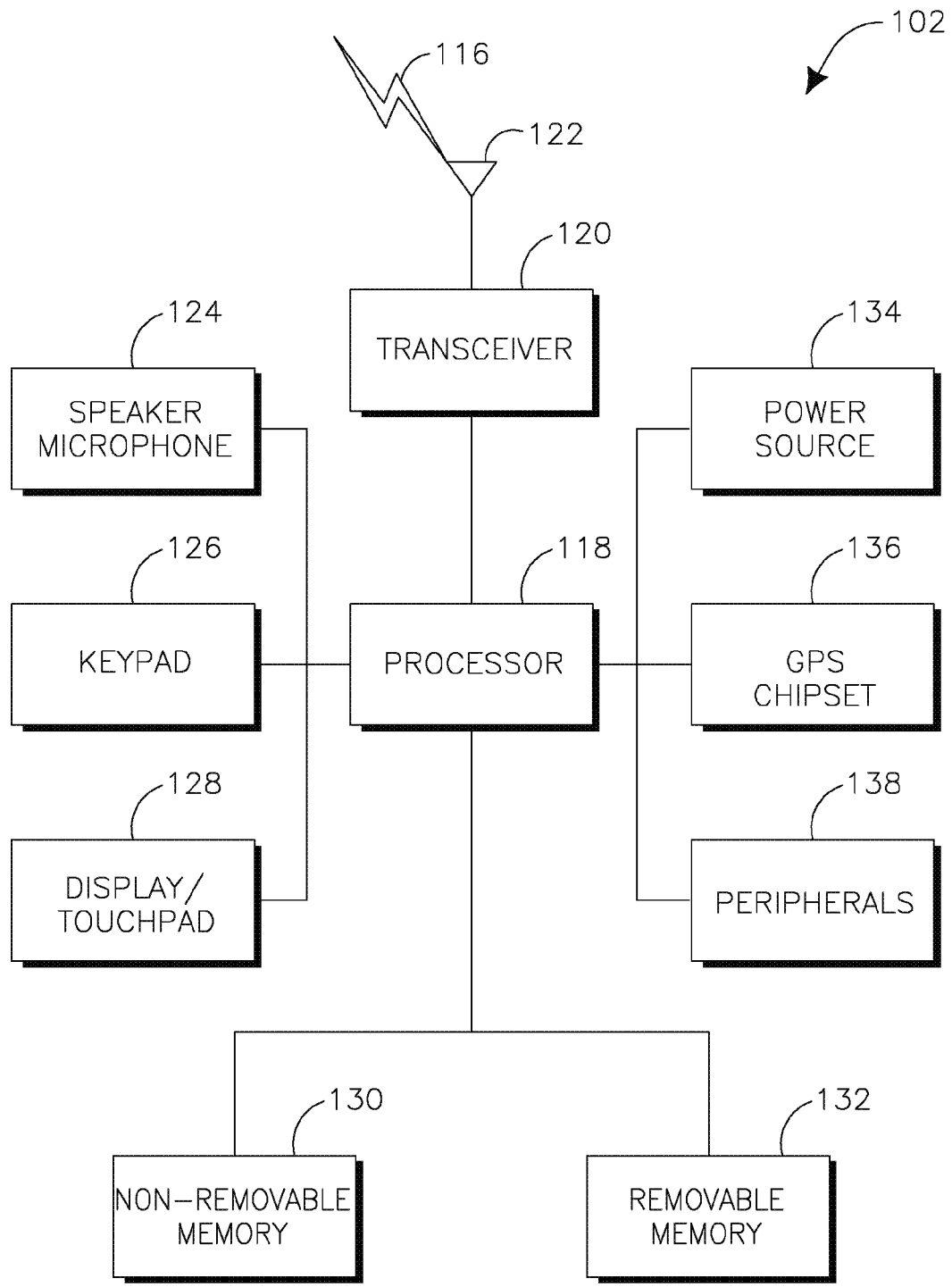
FIG. 1B is a system diagram of an example wireless transmit/receive unit (WTRU) that may be used within the communications system illustrated in FIG. 1A.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
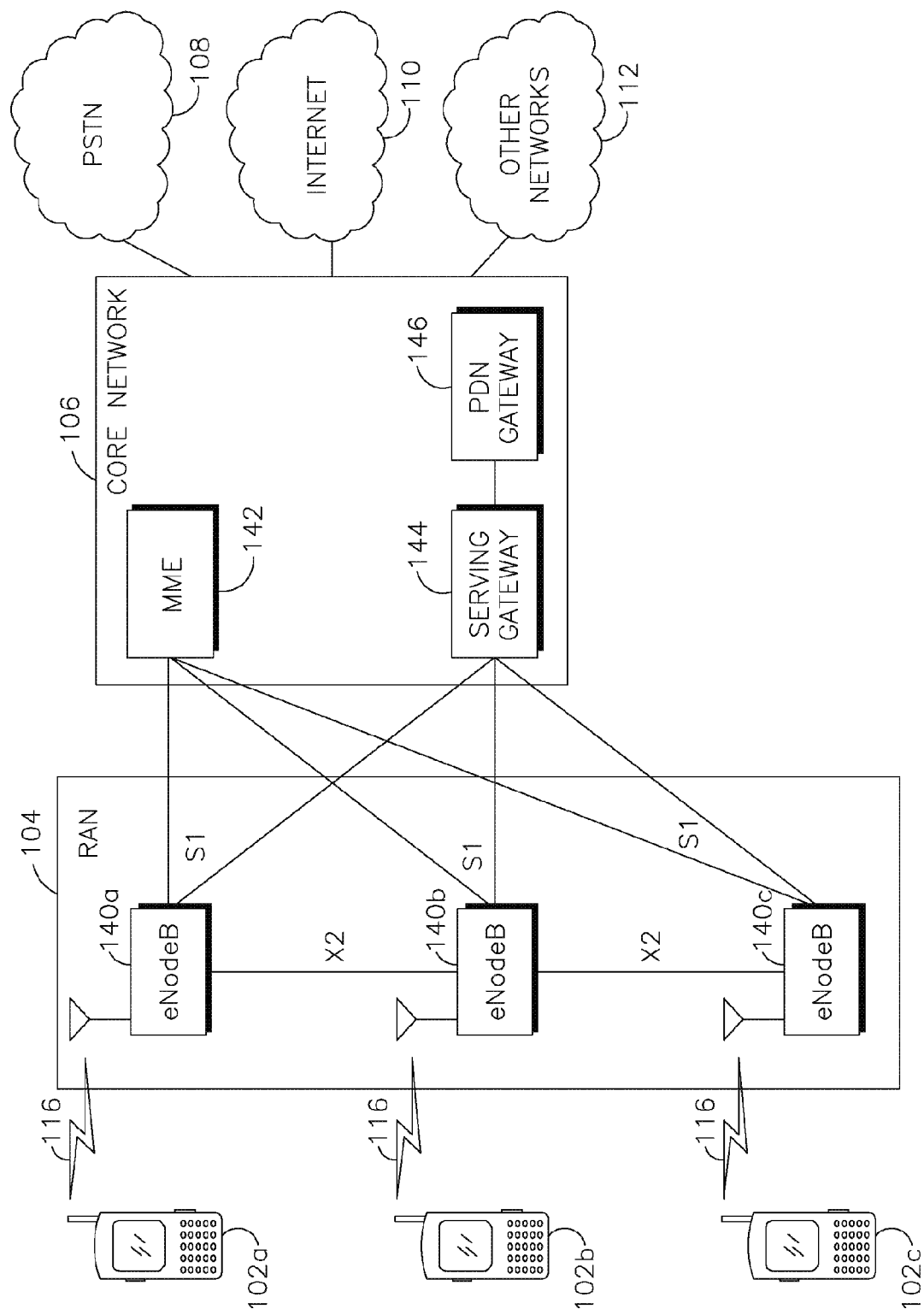
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

A method for coordinating silent periods for spectrum sensing in a cognitive radio (CR) network may allow for the continuous collection of spectrum utilization information by a centralized management entity. The method may also allow a CR device that is pre-empted by a primary user to quickly move to an unused band of frequencies without causing interference to the primary user arriving on that band. The coordination method may also stress efficiency in the CR node in order to minimize the complexity of context switching and real-time traffic management that may be a consequence of silent periods in the CR nodes.

The CR network includes one or more CR nodes that may communicate over a licensed band of one or more primary users using a wireless link. The CR nodes may be configured to periodically perform spectrum sensing on the licensed bands to detect the presence of a primary user and gain knowledge of the available spectrum for use in direct links between nodes.

In order to perform silent period coordination for the CR nodes, a centralized controller may be used as a Dynamic Spectrum Manager (DSM). The DSM may be configured to dynamically allocate bandwidth from the licensed band to CR nodes for the creation of a direct link. Further, the DSM may be responsible for scheduling the silent periods for spectrum sensing in each of the CR nodes in its management area, and collecting the sensed information in order to determine the available bandwidth that may be used by CR nodes. The DSM may be a specialized node such as an AP, in a Home enhanced-Node B (H(e)NB), or may itself be a CR node that is selected as a cluster or management area head to perform specialized DSM tasks. The DSM and the CR nodes in the CR network may use a licensed band or an unlicensed band for exchange of data and control information.

Figure 2:
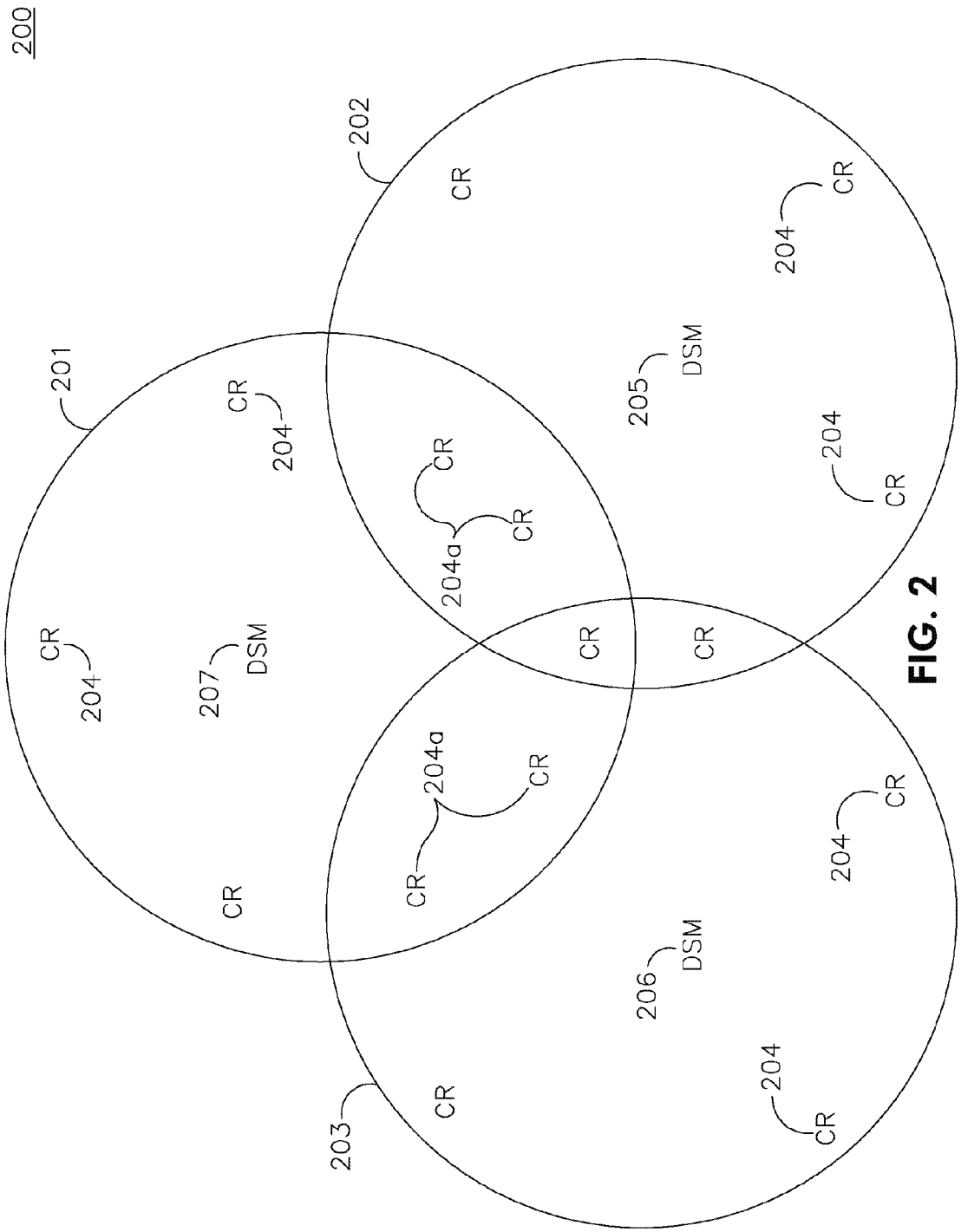
FIG. 2 is an example of a CR node network that is portioned into small localized regions.

FIG. 2 illustrates a CR node network 200 that may be portioned (cellularized) into small localized regions or cells 201, 202, and 203. Each cell coordinates its own localized measurement intervals. However, CR nodes 204A not in the middle of a particular cell 201 will interfere with measurements in adjacent cells 221 and 203. FIG. 2 illustrates a need for coordinating quieting intervals locally in a way that a DSM 205 (for example) can be enabled to coordinate quieting intervals for all CR nodes 204 and 204A that it may interfere with, but without undue interruption to a CR node's 204A ability to transmit.

Figure 3:
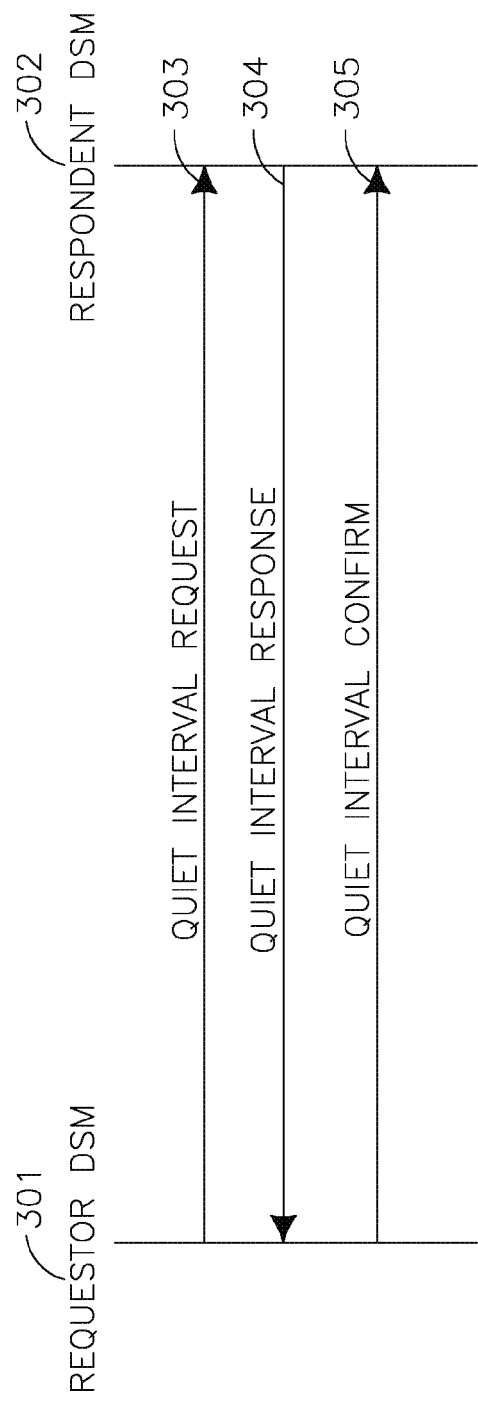
FIG. 3 is an example of basic quiet interval scheduling protocols.

FIG. 3 is an example of basic quiet interval scheduling protocols. FIG. 3 shows a requestor DSM 301 and a respondent DSM 302. The requestor DSM 301 may determine that a spectrum management needs to be scheduled and may transmit a quiet interval request to all known neighbors (303). The respondent DSM 302 may respond to the request with either Accept or Reject in a quiet interval response (304). If the request is accepted by at least a "sufficient" number, percentage, or type of respondent DSMs 302, the requestor DSM 301 may schedule a quiet interval by transmitting a quiet interval confirm message (305). The requestor DSM 301 may optionally transmit a list of other respondent DSM 302 who accepted the request. This may allow some of the respondent DSMs 302 to schedule their own measurements at the same time if they determine that their own spectrum will be sufficiently quiet. The issue of "sufficiency" in the acceptance of respondent DSMs 302 may be of critical importance.

A state machine may be defined for each respondent DSM 302 in order to be more responsive to the needs of a respondent DSM 302. For example, the state machine may be used to determine whether a respondent DSM 302 needs to make a measurement, whether a respondent DSM 302 has been requested to support a particular quieting interval, or whether a respondent DSM's 302 need to make a measurement has been satisfied, etc.

Figure 4:
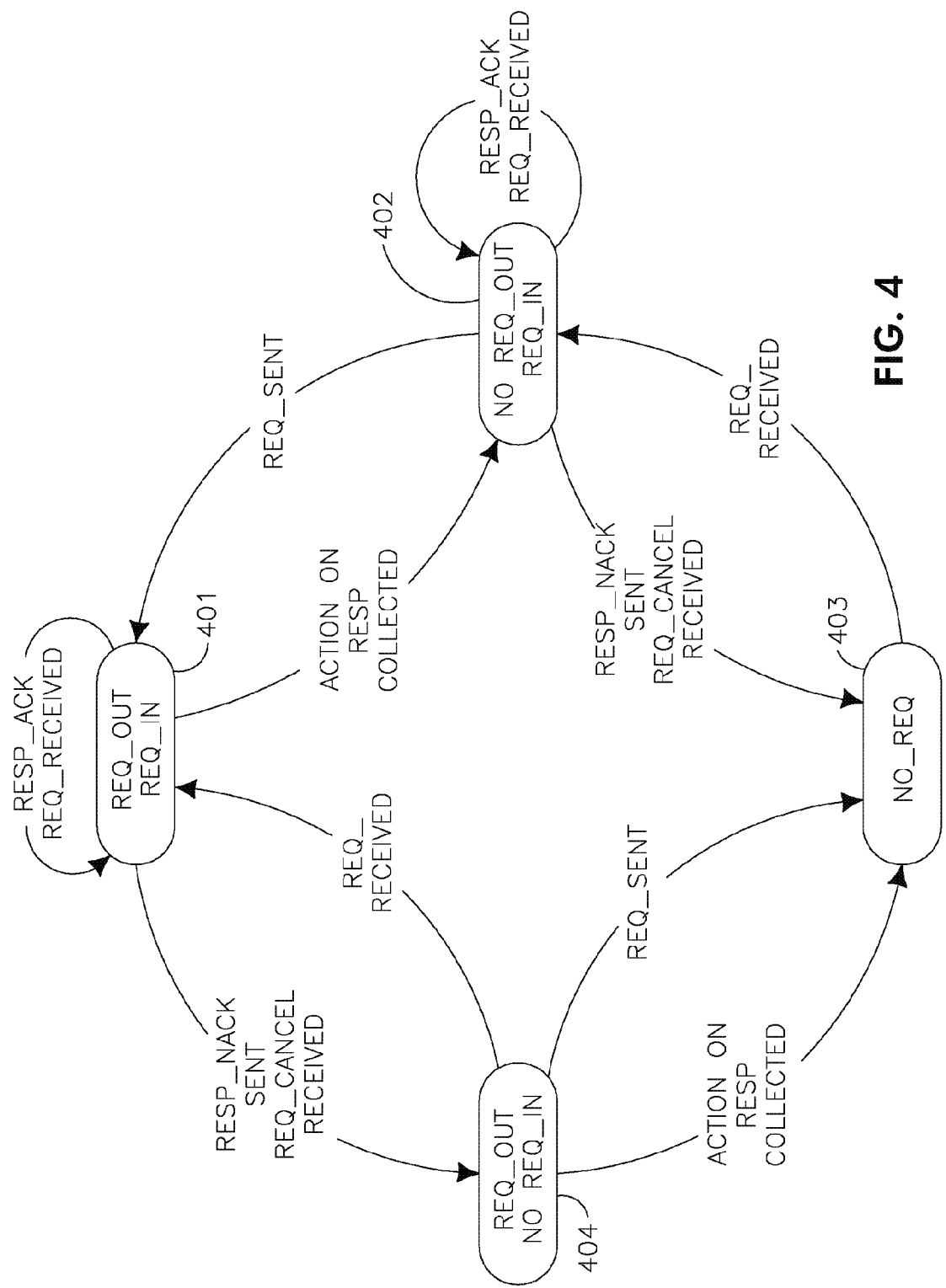
FIG. 4 is a state transition diagram for coordinated spectrum sensing within each node.

A CR node may be in one of four (4) states, as shown in FIG. 4, which shows a state transition diagram. In a first state (NO_REQ), the CR node may either not need to make a measurement or its measurement needs may be satisfied and therefore may have made no requests for a measurement. Additionally, the CR node may have received no request for quieting. This is equivalent of an "idle" state in this process. In a second state (REQ_OUT/REQ_IN), the CR node may have an outstanding measurement request and it may have received a request itself. In a third state (REQ_OUT/no_REQ_IN), the CR node may have an outstanding measurement request, however, it may have received no requests itself. In a fourth state (no_REQ_OUT/REQ_IN), the CR node may have no outstanding measurement requests. The CR node may not require a measurement or the CR node may have received a request itself.

FIG. 4 provides further detail on additional messaging needed beyond the approach shown in FIG. 3. From FIG. 4 several observations may be made on operation of each requestor DSM 301.

When a requestor DSM 301 receives a request for a quieting, (REQ message), it may transition, (or stay in), either the NO_REQ_OUT/REQ_IN 402 or REQ_OUT/REQ_IN state 401.

Transmission of a negative response to a request (RESP_NACK) or reception of a cancellation of a request (REQ_CANCEL) may result in a transition to NO_REQ 403 or REQ_OUT/NO_REQ_IN state 404.

Acceptance of a request, which results in a transmission of RESP_ACK message, may keep the node in either the NO_REQ_OUT/REQ_IN 402 or REQ_OUT/REQ_IN 401 state.

The following transitions, REQ_OUT/NO_REQ_IN 404 to NO_REQ 403 and REQ_OUT/REQ_IN 401 to NO_REQ_OUT/REQ_IN 402 may indicate a resolution of a request transmitted by a respondent DSM 302. This may happen in one of a number of ways. For example, a node may determine to cancel the request, (transmitting a REQ_CANCEL message). This may happen for a number of reasons, such as a reception of a sufficiently large number of NACKs for the request to be declined, a decision to use another quieting interval, (i.e. one initially scheduled by another respondent DSM 302), and a time-out of the request. In another example, a node may have received a sufficient number of ACK responses and may have transmitted a REQ_CONFIRM message confirming the measurement period.

Based on the specific demands and configuration of each system, the basic protocol described above may be modified in a number of ways. For example, the protocol described above may result in significant overhead and delay if the number of nodes in a network is large. This may be addressed by adding a Scheduling Service Node (SSN). The SSN node may facilitate communication between the requestor DSM and the one or more respondent DSM in the network. In particular, the basic protocol of FIG. 3 is preserved. However, the Quiet Interval Request message may be transmitted to the SSN first which then forwards the Quiet Interval Request message to the respondent DSM. The respondent DSM may also respond to the SSN which may forward all the responses to the requestor DSM and may then forward the Confirm message back to the respondent DSM.

The SSN, however, may take a more productive role in the process. Instead of just acting as the neighbor database and message relay, it may take on the role of a quiet interval scheduler. The resulting embodiment is shown in FIG. 5.

Figure 5:
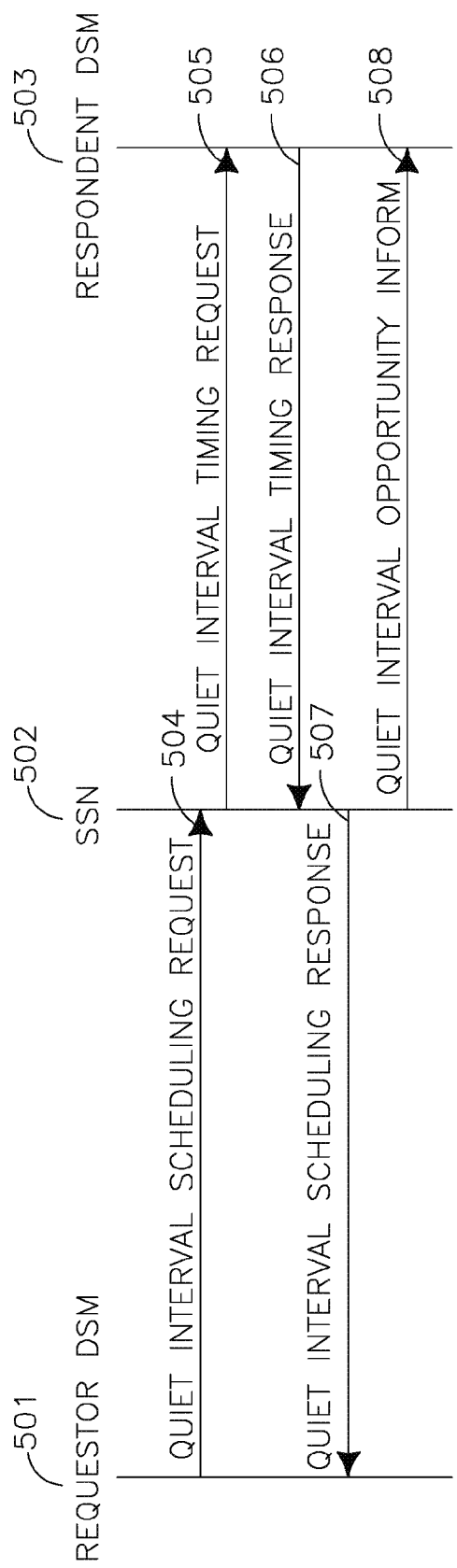
FIG. 5 is an example of an enhanced protocol with the SSN acting as a scheduler for quiet intervals.

FIG. 5 shows an example of an enhanced protocol with the SSN acting as a scheduler for quiet intervals. In this embodiment, the requestor DSM 501 transmits a scheduling request to the SSN 502 (504). The SSN 502 may transmit a timing request to all of the requestor DSM's neighbors, (respondent DSM 503) (505). Such respondent DSM 503 may accept or reject such request from the SSN 502 (506). Based on the accept/reject responses, the SSN 502 may attempt another time-resulting in several rounds of the Quiet Interval Timing Request/Response exchanges between the SSN 502 and a plurality of respondent DSM 503 (506) Assuming that a successful quieting time is eventually found, the SSN 502 may issue a scheduling response to the requestor DSM 501 (507). At the same time, the SSN 502 may notify certain respondent DSM 503 that may also benefit from this quiet interval that a measurement opportunity will be available to them as well (508).

This approach offers a number of benefits over the baseline approach without an SSN. For example, a lower backhaul/side channel communication load, as the scheduling handshakes are now only between an SSN and respondent DSM and not the requestor DSM and respondent DSM. Another benefit is lower processing/memory load on terminals which may no longer need to be aware of network topology, their neighbors, etc. This is especially important in networks where mobility is present. A further benefit is the ability of the SSN to coordinate the scheduling of quiet intervals so that more than one requestor DSM is granted the same interval, thus reducing the overall number of quiet intervals and increasing efficiency of the network.

The SSN may also assume the role of quiet interval controller, whereby it may periodically attempt to schedule quiet intervals autonomously, (e.g. without a request), for the benefit of a group of terminals which are then provided measurement opportunities. In this case, the SSN-respondent DSM exchange described in FIG. 5 is used, but the messaging between the requestor DSM and the SSN may no longer be needed.

There are several information elements that may need to be present in the messages. The following messages have been previously defined: REQ, (request for a quiet interval for messages), RESP_ACK, (response to a request acknowledging the request, for example agreeing to it), RESP_NACK, (response to a request declining it), REQ_CANCEL, (cancellation of a request), and REQ_CONFIRM, (confirmation that a request is being "locked"). Each one of these messages may contain the following elements which are used for identification, synchronization, and decision making, such as requestor DSM/respondent DSM ID, request ID, (to differentiate different requests), request/response network time, requestor DSM/respondent DSM geo-location, and respondent DSM maximal transmit power.

A request for quieting requires a sufficient number of positive acknowledgement (ACK) responses for the requestor DSM to schedule a quiet interval. The central issue is how many ACK responses are sufficient. The goal of quieting is to eliminate emissions from primary users to a level sufficiently below the required sensing threshold so that sensing can be performed. In a network where the number and location of non-primary users is fairly well-known, a first approach for determining sufficiency may be done by counting the number of responses. Counting the number of responses can be performed most efficiently by the SSN.

A different approach may be to ignore all the NACK responses from respondent DSM whose location and transmit power are such that their emissions are below the sensing threshold. Thus, the respondent DSM's maximal transmit power and geo-location, may enable this approach. Conversely, the requestor DSM's geo-location may allow a device to decline a request without causing disruption because it knows that its transmit power is too low to impact the measurement. Finally, this may support partial quieting, where devices, having accepted a request (ACK'ed it) reduce their transmit power below the level it impacts the measurement at the requestor DSM, while maintaining some connectivity.

Figure 6:
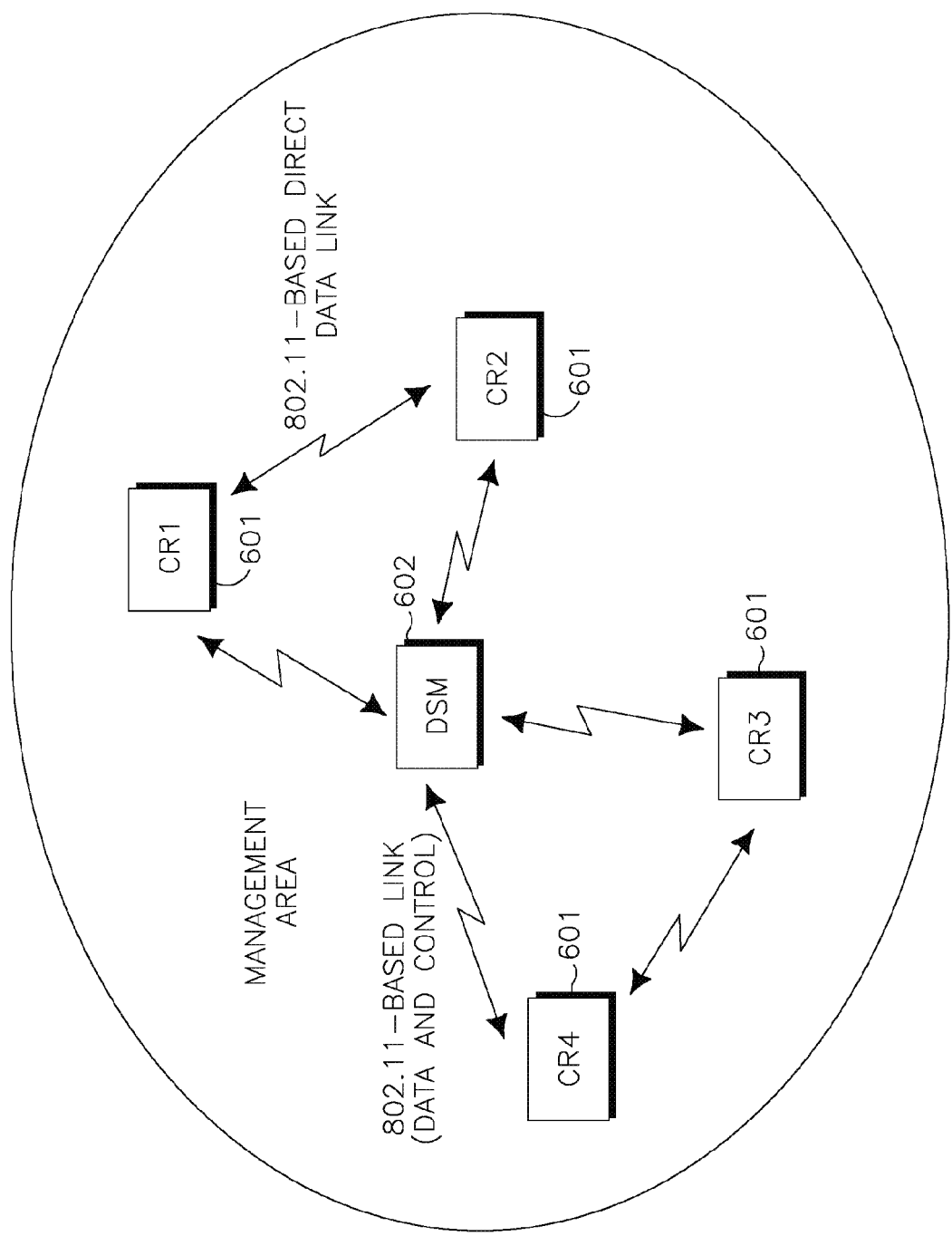
FIG. 6 show an example scenario for silent period coordination.

FIG. 6 illustrates an example scenario for silent period coordination within a particular cell. The system may consist of a set of CR nodes 601 which want to establish direct links between each other. The set of CR nodes 601 may employ the bandwidth allocated by the centralized DSM 602, which is also responsible for coordinating the silent periods required for spectrum sensing on the bands actively used by the direct links.

In the example shown in FIG. 6, although the links between the DSM and the CR nodes, as well as the direct links between CR nodes are shown to utilize 802.11-based MAC/PHY, the methods described herein are independent of the MAC/PHY used for this connection. Therefore, this connection could potentially use a different MAC/PHY such as for a cellular system.

Several, or all, of the CR nodes may first perform spectrum sensing simultaneously during periodically occurring silent periods. The DSM may be responsible for configuring the length and frequency of the periodic silent periods, and the band over which each CR node may perform spectrum sensing during each silent period. Periodic silent periods may be scheduled at a frequency in which maximum quality of service for the CR nodes may be maintained. The use of periodic silent periods may also allow the DSM to maintain a dynamic map of the licensed bandwidth which may be currently utilized or free at a particular period of time. As a result, the CR network may maintain a minimum level of knowledge concerning the available bands and some degree of agility to the arrival of primary users on the bands that may be occupied by CR nodes.

In addition to periodic silent periods, the DSM may schedule asynchronous silent periods to perform immediate spectrum sensing, thus improving the network's agility. The silent periods may be triggered by either the DSM itself, based on information about a primary user that may be available from other networks, or by an event triggered by any of the CR nodes that may be currently using a licensed band. The use of asynchronous silent periods may give the CR network the agility to have CR nodes vacate the licensed bands within a shorter amount of time than with periodic silent periods.

Further, the asynchronous silent periods may allow the CR network to make use of information about the primary user in a more timely fashion. Information about the primary user may be in the form of a change in the environment or a priori information about the primary user. The change in the environment may be detected by any of the CR nodes. The DSM may have available the priori information from the primary user network itself.

In the case where the arrival of a primary user on a specific band may be sensed by a change in the environment, one or more of the CR nodes may be actively using the band in question and may be able to sense the change in the environment through a local change in current key parameters associated with the active link. The parameters may be, but are not limited to, the channel quality, link throughput, number of retransmissions, and the like.

Although a change in any of the parameters may indicate the arrival of a primary user, an asynchronous silent period for spectrum sensing may be triggered to immediately determine whether a primary user may be present, and may have accurate, up to date information about the available bands following this change in environment. An asynchronous silent period may also be extended by the DSM in the case where the reliability of the decision obtained from spectrum sensing a single silent period is insufficient to determine the presence of a primary user and to suggest moving the primary user to alternate bands being pre-empted by the CR node.

A change in the environment may include using interference cancellation or any other means for the actual transmitted signal to detect a change in the environment. The sensor for the change in environment may be part of the same node that does the transmission. The sensor may also be a separate entity, protocol layer, or algorithm which communicates with the spectrum sensing entity.

Figure 7:
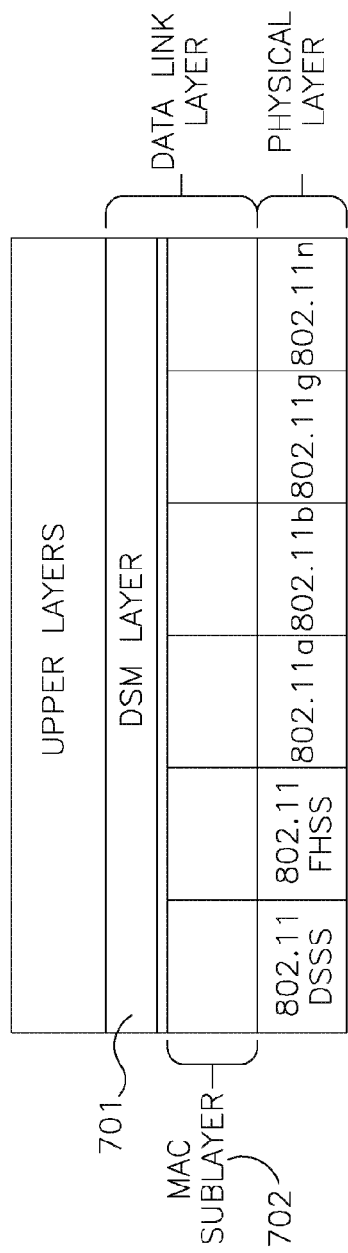
FIG. 7 shows an example of a DSM layer in an 802.11-based protocol stack.
Figure 8:
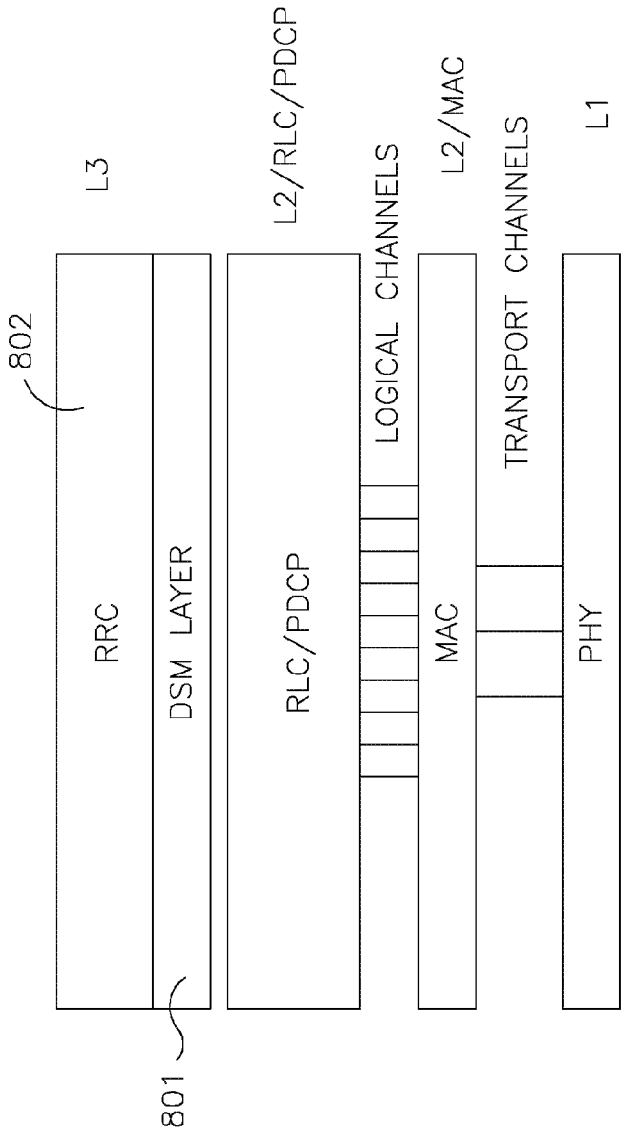
FIG. 8 shows an example of a DSM layer in a cellular-based protocol stack.

The scheduling of silent periods may be enabled through the use of a thin DSM protocol layer. This protocol layer may be an L2.5 or L3 entity that is independent of the RAT or PHY used by the network. The use of the thin DSM protocol layer allows for a DSM protocol layer on a network with devices having different RATs. FIGS. 7 and 8 illustrate the placement of this DSM layer in an 802.11-based network (FIG. 7) and a cellular-based network (FIG. 8).

FIG. 7 shows an example of a DSM layer in an 802.11-based protocol stack. In FIG. 7, the DSM layer 702 is shown adjacent to the MAC sublayer 703 in the 802.11 protocol stack 701. FIG. 8 illustrates an example of a DSM layer in a cellular-based protocol. In FIG. 8, the functionality of the DSM layer 802 may also be incorporated into an existing management layer 803 in a cellular-based protocol stack 801 as well. Examples of existing management layers which could incorporate this functionality is 802.11 or 802.16 management frames, Zigbee (for management of 802.15.4 MAC/PHY devices), or RRC (for cellular networks). The main functions of the DSM layer may be to create and interpret Silent Period and Sensing Control Messages in order to coordinate silent periods used for measurement and detection of potential primary users on the licensed band being utilized by the DSM-managed network, to determine the appropriate times to trigger silent periods, and to configure the appropriate spectrum sensing operations by the PHY and notify the PHY when spectrum sensing may take place.

The thin DSM protocol layer defines a set of control messages which may be used to enable silent period handling. There are four control messages: Silent Period Start Control Message, Silent Period Trigger Control Message, Measurement Report Control Message, and Sensing Configuration Control Message.

The Silent Period Start Control Message may be transmitted by the DSM node to one or more CR nodes in the network. This message may be addressed to a subset of nodes under the management of the DSM based on the location of these nodes. This location information may be maintained by the DSM entity through appropriate MAC-layer procedures.

The Silent Period Trigger Control Message may be transmitted by any CR node in the network that is communicating with the DSM. The message may be addressed to the DSM to which the particular CR node is registered.

The Measurement Report Control Message may be transmitted by the CR that has been instructed to perform spectrum sensing during the silent period. This message may be transmitted to the DSM, which may make a decision concerning the presence or absence of another network or primary user based on the measurement results.

The Sensing Configuration Control Messages may be transmitted by the DSM to configure spectrum sensing to be performed by each CR node.

These messages may be carried by the underlying MAC layer with a higher priority than normal data. These messages may also be transmitted using MAC layer management frames. The DSM may periodically transmit a Silent Period Coordination Message to all of the CR nodes to trigger a system-wide silent period during which spectrum sensing may be performed. In steady state operation, silent periods may occur periodically or sporadically. Further the silent periods may be interspaced with periods where the CR nodes perform regular TX (transmit) and RX (receive) operations. The duration and frequency of the silent periods may be controlled by the DSM and communicated to all the CR nodes using the Silent Period Start Control Message. As a result, depending on the current use in the system of the utilized channels, the DSM may determine the frequency associated with the Silent Period Start Control Message.

Figure 9:
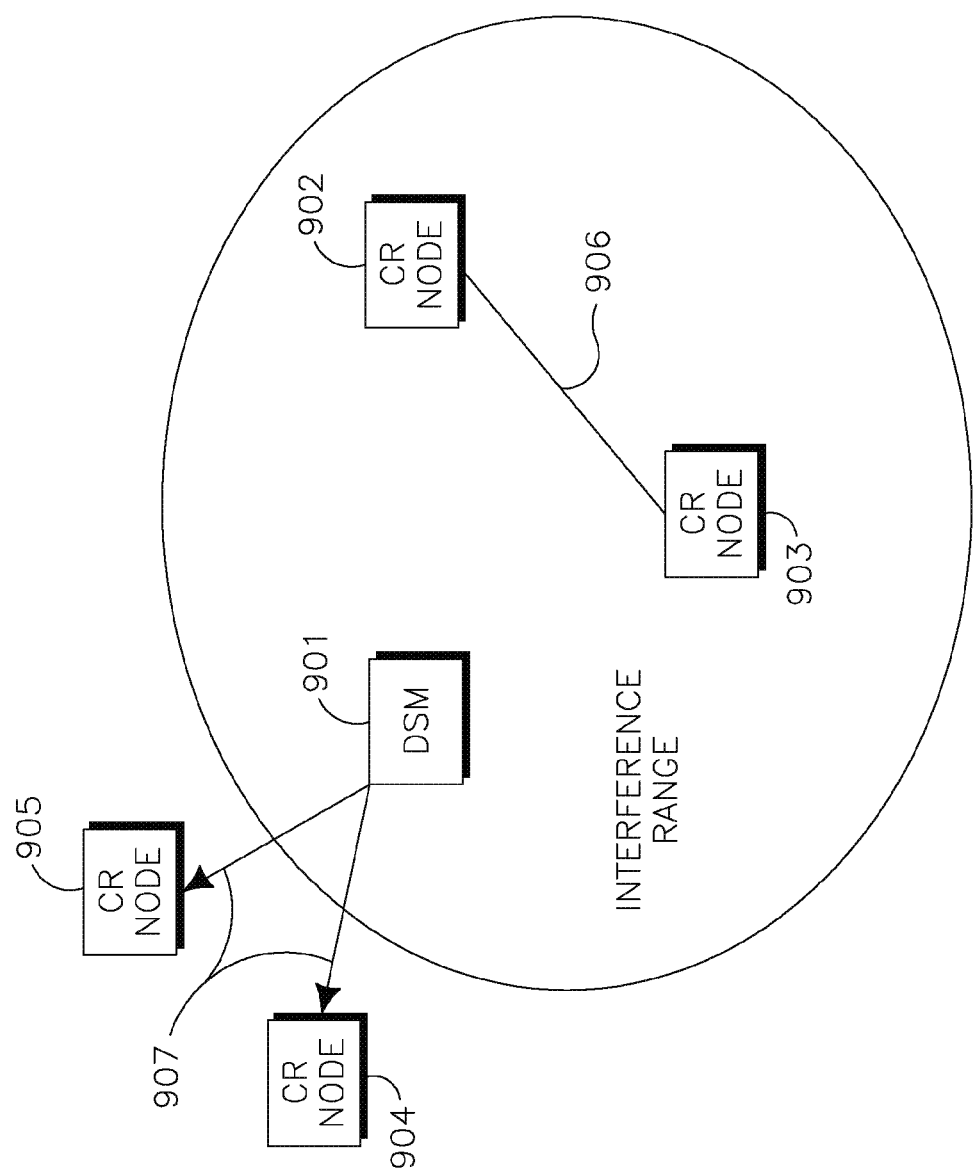
FIG. 9 shows an example of localized multicast silent period start messages for case 1.
Figure 10:
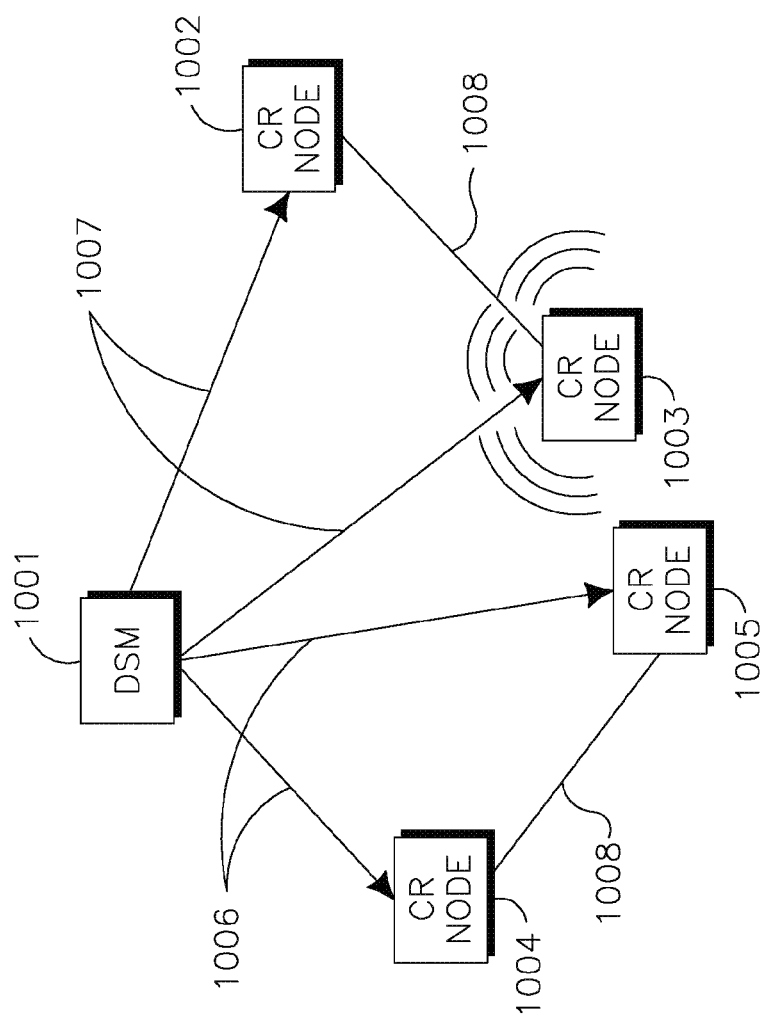
FIG. 10 shows an example of localized multicast silent period start messages for case 2

Silent Period Control Messages may also be transmitted to a subset of CR nodes which are located in a certain location or which are utilizing a certain bandwidth, illustrated in FIGS. 9 and 10. FIG. 9 shows an example of localized multicast silent period start messages for a first case. In FIG. 9, CR nodes 902 and 903 are outside of the range of CR nodes 904 and 905. The DSM 901 may transmit a Silent Period Start Control Message 907 addressed only to nodes 904 and 905. When nodes 904 and 905 receive this message, the nodes 904 and 905 immediately stop transmitting and instruct their PHY layer to perform spectrum sensing of the bandwidth that the nodes 904 and 905 are currently using. Transmission 906 from nodes 902 and 903 occurring on the same frequency as the spectrum sensing do not affect the spectrum sensing results, as these nodes are outside the range of nodes 904 and 905.

FIG. 10 shows an example of localized multicast silent period start messages for a second case. In FIG. 10, nodes 1002 and 1003 are transmitting 1008 on a frequency that is different than nodes 1004 and 1005. At time t1, the DSM 1001 transmits a Silent Period Start Control Message 1006 to nodes 1004 and 1005 to start spectrum sensing on the frequency currently utilized by these two nodes. At time t2, the DSM 1001 transmits a Silent Period Start Control Message 1007 to nodes 1002 and 1003. These silent periods are repeated periodically with the period determined by the DSM 1001.

Asynchronous silent periods may be triggered in two ways to enable a better response to a change of environment. In a first case, an external network may notify the DSM of the presence of a primary user, or other information, such as history, which may be used by the DSM to predict the possible presence of a primary user on a specific band. In this case, the DSM itself may schedule an asynchronous silent period without the inputs of any of the CR nodes.

Asynchronous silent periods may also be triggered by an event created in any of the CR nodes actively using a link on one of the licensed bands. This event may result from a change in the environment on that link. Asynchronous silent periods triggered by an external network, or by the DSM itself, are treated in the same fashion as those triggered by a CR node event.

The procedure for a CR node triggering the asynchronous silent period may include a CR node in the network detecting a change in environment. This change may be detected at the CR node by the PHY or MAC layers, or may be an event that is specific to the DSM layer itself, (e.g. the detection of a new node which joins the network). After this occurs, the CR node may transmit a Silent Period Trigger Message to the DSM. The Silent Period Trigger Message may contain the cause or reason for the event trigger.

The DSM may determine the necessity of triggering an immediate asynchronous silent period based on the CR node from which the Silent Period Trigger Message was received, as well as the information associated with this message. The DSM may then determine which CR nodes may be silenced during the silent period. This decision may be based on the frequency band on which spectrum sensing may be performed, and the nodes which are in close proximity of the CR node that generated the Silent Period Trigger Message. The DSM may make use of position information, which it stores in a local position database, in order to determine the interference range of each of the CR nodes, and from that, the nodes which may receive the Silent Period Start Control Message.

A CR node that generates a Silent Period Trigger Message may continue normal TX/RX operations until it receives a Silent Period Start Control Message. The Silent Period Start Control Message may indicate the starting time and the duration of the silent period. During the silent period, all nodes which have been addressed by the Silent Period Start Control Message may interrupt any transmission which was ongoing. In addition, messages which were scheduled for transmission may be buffered by these CR nodes until the end of the silent period.

During the silent period, spectrum sensing may be performed by the nodes associated as spectrum sensing nodes for a particular spectrum sensing entity. A spectrum sensing entity may be created or modified using a Sensing Configuration Control Message. The control message may be transmitted to the CR node which may be asked to perform spectrum sensing on a particular frequency, and may inform the CR node of the spectrum sensing entity identifier that it is associated with. A CR node may be associated with multiple spectrum sensing entities, in which case it may be called on as the node to perform spectrum sensing on multiple frequencies, for instance. In addition, multiple CR nodes may be associated with the same spectrum sensing entity identifier, which enables having the same DSM collect spectrum sensing results from multiple nodes to enable sensor fusion.

The DSM may become aware of the spectrum sensing capabilities of each device during the device's initial association. At any time, for example following association of a node or following the start of a high bandwidth link between two CR nodes, the DSM can create a spectrum sensing entity and attach a set of sensory nodes to it. A separate spectrum sensing configure message, containing the unique identifier of the spectrum sensing entity, may be transmitted to each of the nodes attached to a spectrum sensing entity. The Sensing Configuration Message may also contain configuration that is specific to the CR node in question with regards to the spectrum sensing. When a Silent Period Start Control Message is transmitted, it may contain the unique identifiers of the spectrum sensing configuration entities that may be activated within the coming silent period. The CR nodes receiving the Silent Period Start Control Message, which have been asked to perform spectrum sensing associated with the spectrum sensing entity identifier contained in the Silent Period Start Control Message, may be responsible for performing spectrum sensing and transmitting the results to the DSM at the end of the silent period.

Figure 11A:
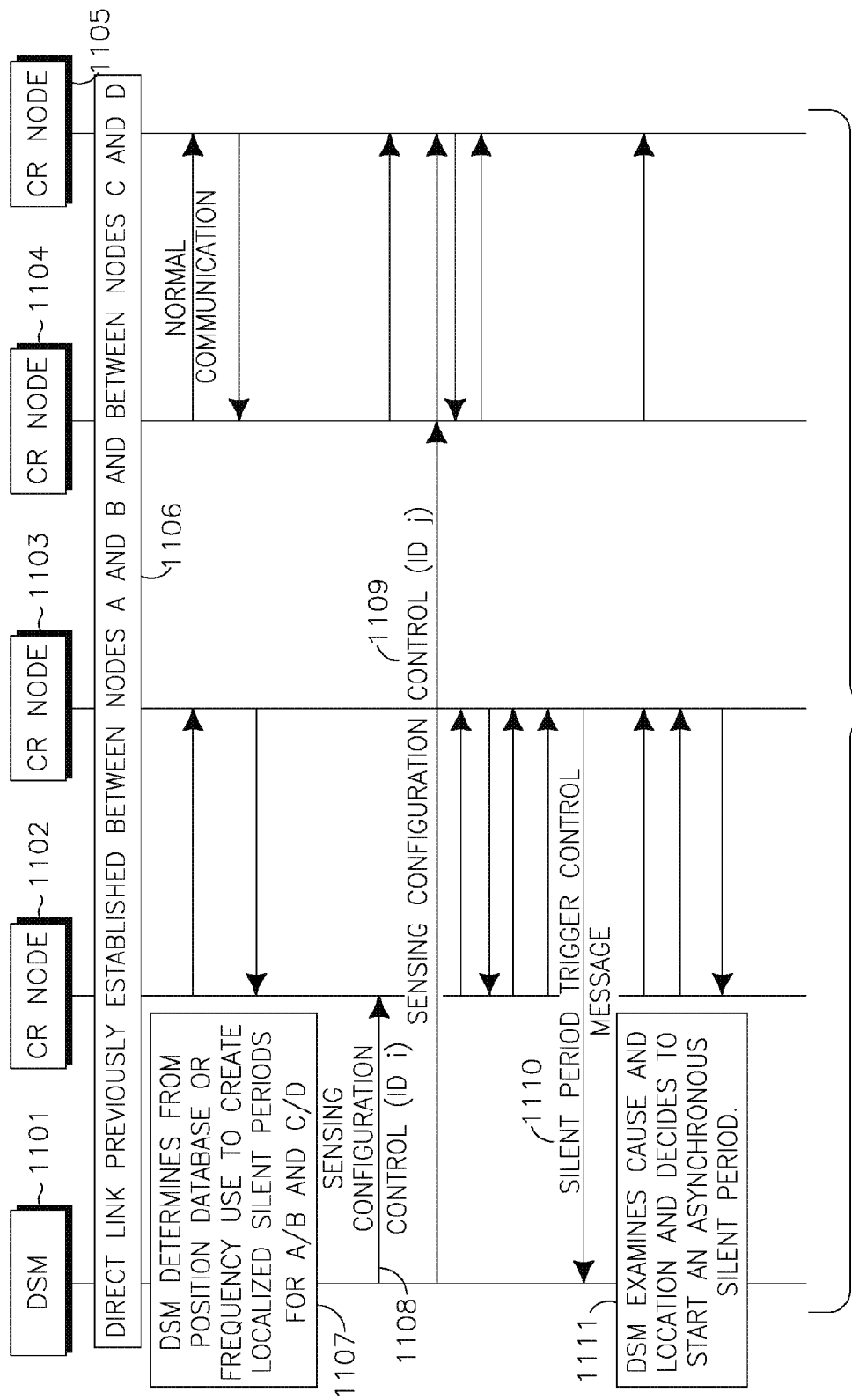
FIGS. 11A and 11B illustrate an example of a call flow for asynchronous silent periods.
Figure 11B:
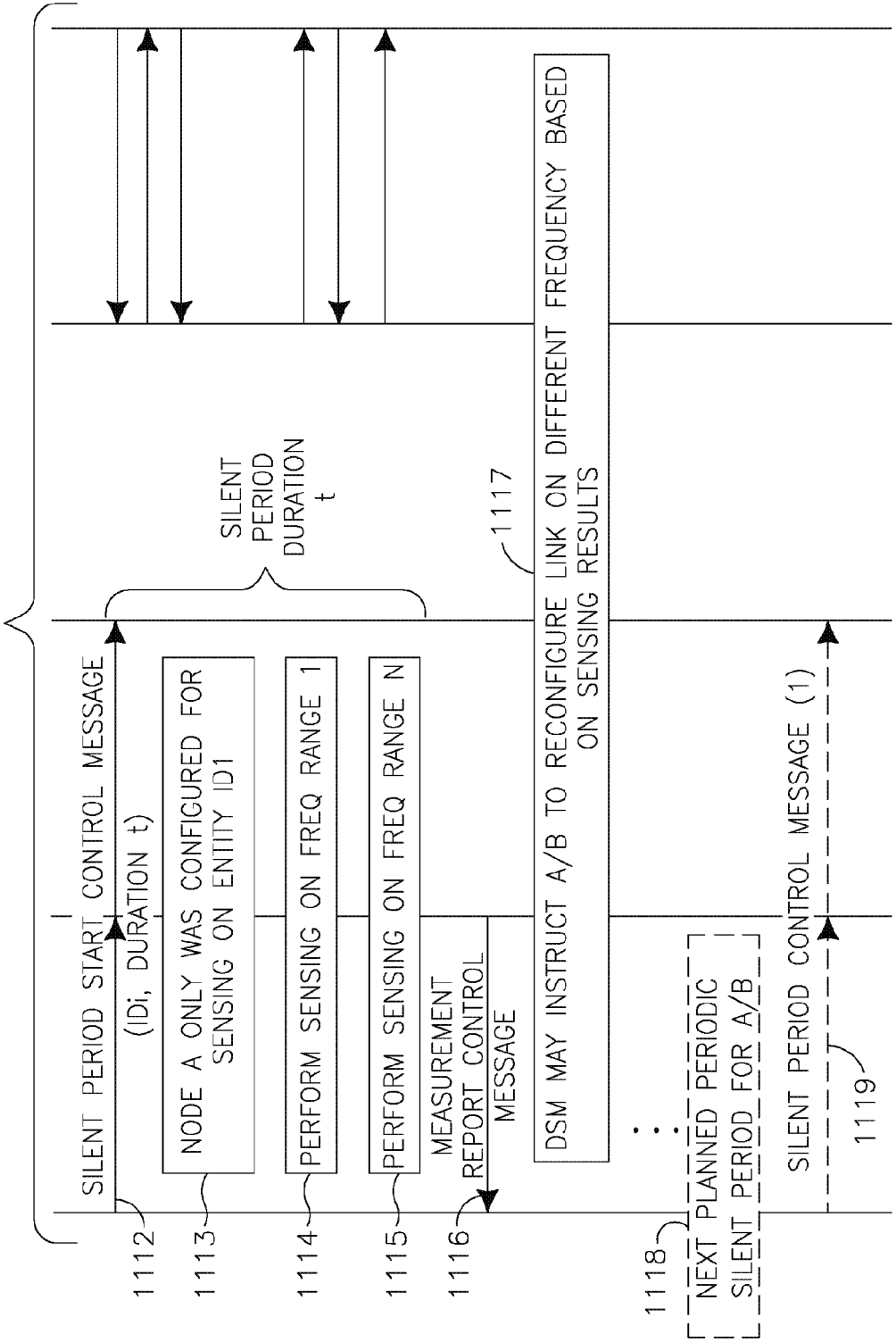

FIGS. 11A and 11B illustrate an example of the procedure described above, (a call flow for asynchronous silent periods), and each of the actions involved in triggering an asynchronous silent period.

In this example, the silent period may be triggered locally between CR node 1102 and CR node 1103 due to interference, range, or frequency use. A direct link between nodes 1102 (Node A) and 1103 (Node B) and between nodes 1104 (Node C) and 1105 (Node D) may have been previously established (1106). The DSM 1101 may determine from position database or frequency use to create localized silent periods for nodes 1102 and 1103 and nodes 1104 and 1105 (1107). A Sensing Configuration Control message may be transmitted from the DSM 1101 to node 1102 with an identification of i (1108). A Sensing Configuration Control message may be transmitted from the DSM 1101 to node 1104 with an identification of j (1109). A Silent Period Trigger Control Message may be transmitted from node 1103 to the DSM 1101 (1110). The DSM 1101 may examine cause and location and determine to start an asynchronous silent period (1111). A Silent Period Start Control Message may be transmitted from the DSM 1101 to node 1102 and from node 1102 to node 1103 with an identification of i and a duration of t (1112). Node 1102 may only be configured for spectrum sensing on an entity with an identification of 1 (1113), may perform spectrum sensing on frequency range 1 (1114), and may perform spectrum sensing on frequency range N (1115); all of which occur during the silent period duration t. Node 1102 may transmit a Measurement Report Control Message to the DSM 1101 (1116). The DSM 1101 may instruct nodes 1102 and 1103 to reconfigure link on a different frequency based on spectrum sensing results (1117). The DSM 1101 may begin the next planned period silent period for nodes 1102 and 1103 (1118). A Silent Period Start Control Message may be transmitted from the DSM 1101 to node 1102 and from node 1102 to node 1103 (1119).

The occurrence of an asynchronous silent period may move the timing of a normal periodic silent period. For example, if an asynchronous silent period eliminates the need for a scheduled or immediately upcoming periodic silent period, the DSM may choose to cancel the upcoming silent period or reschedule the timing of the periodic silent period accordingly.

Figure 12:
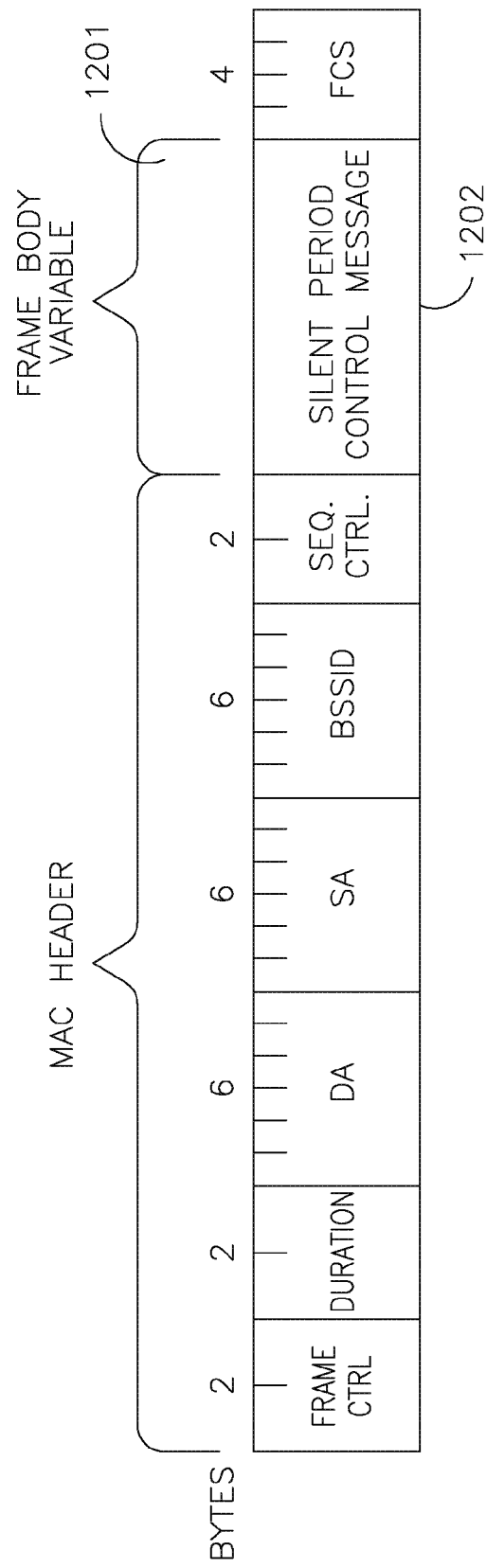
FIG. 12 shows an example of MAC management frame for silent period control messages.

In another embodiment, the DSM Silent Period Control Messages use 802.11 Management Frames, where the DSM layer may lie above the MAC sublayer in the protocol stack of FIG. 7. FIG. 12 shows the format of an 802.11 management frame. The frame body 1201 may contain an identifier 1202 for the type of frame, (Silent Period Start Control Message, Silent Period Trigger Control Message, Measurement Report Control Message, or Sensing Configuration Control Message), as well as the information needed for each message.

Figure 13:
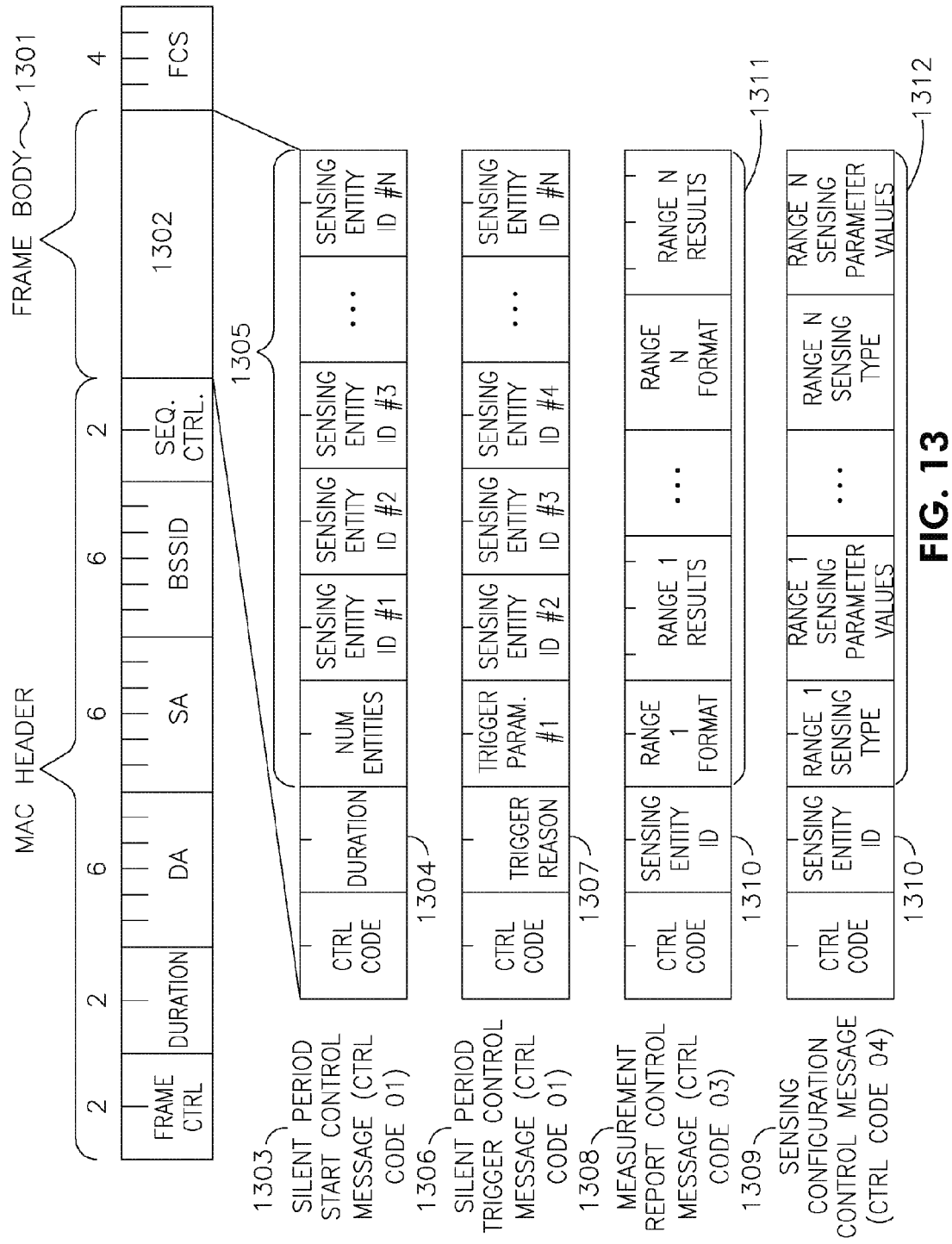
FIG. 13 shows an example of fields in each silent period control message.

FIG. 13 illustrates each of the sensing configuration message management frames described above. Each message is identified with a unique control code field. As in FIG. 12, the frame body 1301 may contain an identifier 1302 for the type of frame. The Silent Period Start Control Message 1303 may contain a field for the duration 1304, in number of beacon periods, of the silent period and the spectrum sensing entity IDs 1305 for each spectrum sensing operation to be performed during the silent period. When a node was previously configured to perform spectrum sensing for the spectrum sensing entity associated with an ID received in this message, the node may perform spectrum sensing during this silent period. Since multiple spectrum sensing operations may be performed on a specific silent period, for example over different frequency ranges, the Silent Period Start Control Message 1303 may activate multiple spectrum sensing entity IDs 1305. The Silent Period Trigger Control Message 1306 may contain a field for the reason in which the silent period was triggered 1307. This field may identify the protocol layer or mechanism that caused the message to be transmitted by the CR node in question. An example where a Silent Period Trigger Control Message is transmitted as a result of a PHY/MAC measurement exceeding a specific value is described below. Finally, the Measurement Report Control Message 1308 and the Sensing Configuration Control Message 1309 may both be associated with a particular Sensing Entity identifier 1310 and contain this identifier as a field in the management frame. Each spectrum sensing entity may be associated with one or more contiguous or non-contiguous frequency ranges to be sensed. The type of spectrum sensing to be performed on each frequency range, as well as the parameters for this spectrum sensing 1312, may be transmitted using the corresponding field in the Sensing Configuration Control Message 1309. The format for the spectrum sensing results of each frequency range 1311 may be specified in a separate field in the Measurement Report Control Message 1308.

Asynchronous silent periods may also be triggered by CR nodes based on their traffic utilization over a particular frequency. If a node involved in a direct link may be in a sleep or dormant mode for a particular amount of time, or the direct link has no data to transmit for a fixed period of time, the CR node may notify the DSM using a Silent Period Trigger Control Message with the Trigger Reason set to 'sleep'. The DSM may observe the messages received by each CR node and determine whether an opportunity exists to perform spectrum sensing. This same procedure may be used when a node detects a lower than normal amount of traffic occurring for a fixed amount of time on the direct link in question. In either case, the result may be the scheduling of a silent measurement period at a strategic time which maximizes efficiency. The presence of these asynchronous silent periods may then allow the DSM to reduce the frequency of periodic silent periods.

Figure 14:
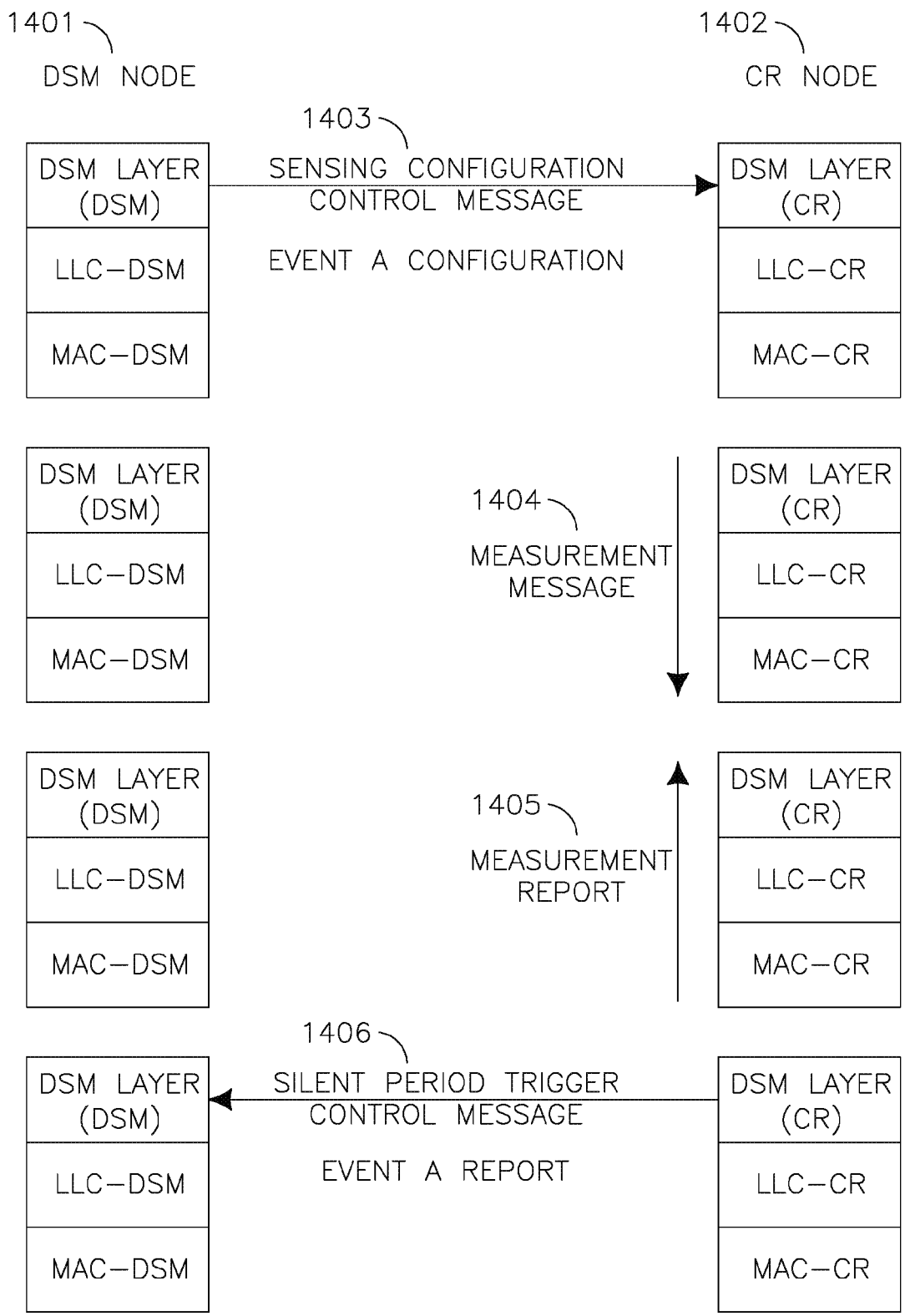
FIG. 14 shows an example of event configuration and reporting in the DSM layer.

FIG. 14 is an example event triggering presented based on a MAC-layer channel quality indication (CQI). The MAC-layer CQI may be defined as the number of packet retransmission or MAC-layer errors observed on a particular channel. Event configurations and event reports are handled by the DSM Layer of the DSM and the CR node respectively, with help of the MAC layer to provide the measurement associated with the event. The DSM Layer of the DSM node 1401 may transmit an event configuration message 1403 to each of the CR nodes 1402 to configure the event to be monitored by the CR node 1402 during its active link with another CR node 1402. This event configuration message can be encapsulated in the Sensing Configuration Control Message described above. Events may also be monitored by CR nodes 1402 which are not actively in a link connection, depending on the type of measurement associated with the event. The Sensing Configuration Control Message may be transmitted through the distinct control channel to each CR node 1402 involved in event monitoring. The MAC layer of the CR node may then be instructed to monitor the CQI of the channel 1404 as defined above. The MAC layer of all CR nodes in an active link connection that may have received the event configuration message may periodically transmit channel quality measurements 1405 to its DSM Layer which may further process or filter them based on event configuration.

Filtering may be performed in order to avoid frequent event triggering and unnecessary spectrum sensing periods. This may be achieved by the introduction of a Time-to-Trigger (TTT), in which the channel quality may be below a certain amount for a minimum amount of time (the TTT) in order for the event to be triggered by the DSM Layer filtering logic. Once the even is triggered, the DSM Layer of the CR node 1402 may transmit an event report 1406 via the Silent Period Trigger Control Message to notify the DSM 1401 of the occurrence of the event and the CR node 1002 where the event occurred.

FIG. 14 illustrates the DSM-Layer signaling and DSM-MAC layer interaction required for configuring and reporting a DSM-related event in the case of a generic protocol stack with a MAC, LLC, and DSM layer. This same message flow may apply to an 802-based system, where the DSM layer may be incorporated into the 802-based management frames, and may also be applied to a cellular protocol stack, where the messages could be transmitted at the RRC layer. Without loss of generality, Event A is triggered where the measured channel quality of a link between two CR nodes drops by a certain amount relative to its long-term average, and the measurements transmitted from the MAC to the DSM entity may be the channel quality indicator (CQI) measurements.

The arrival of a primary user on a licensed band currently being used by a CR node may result in a large amount of interference on this band, which may be detected immediately by a CR node due to a change in the number of MAC-layer errors or retransmissions. In addition, if a primary user begins to use a neighboring band, a certain amount of interference may be detectable in the band currently used by the CR node in question through a drop in the CQI. In either case, the DSM may have knowledge of the presence of the primary user in order to update its database of available frequencies and to reallocate CR users that were occupying the licensed band of interest to a different band.

Figure 15:
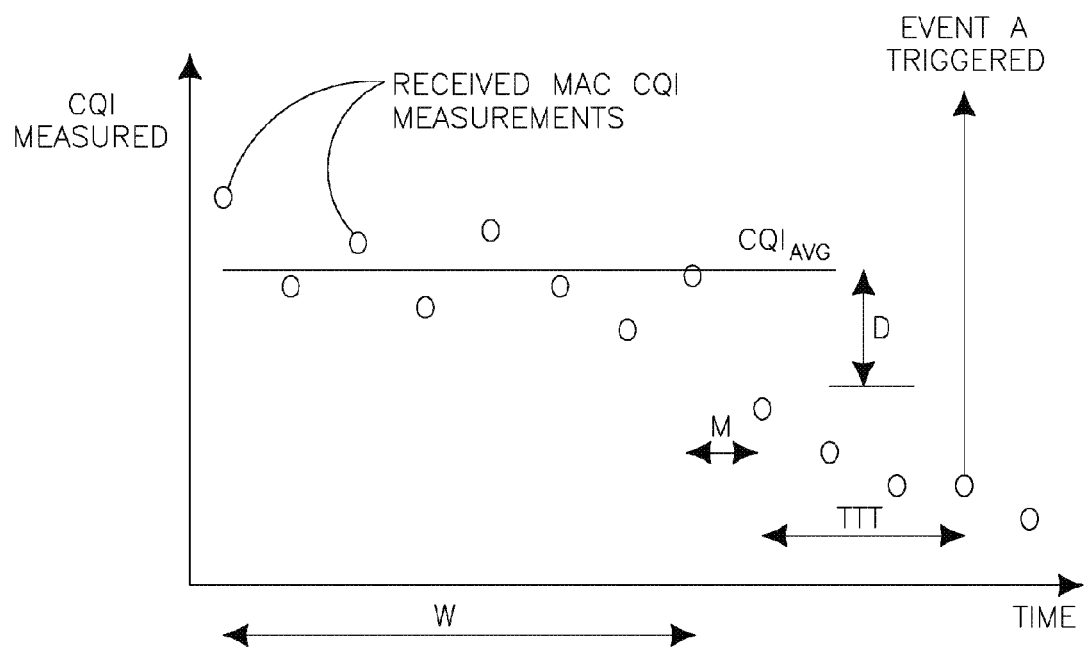
FIG. 15 shows an example of triggering of an asynchronous spectrum sensing event from CQI measurements by a CR node.

FIG. 15 shows the DSM filtering of CQI measurements received from the MAC layer. The CR node may notify the DSM of a detected change in the environment. Each CR node may maintain the average CQI ($CQI_{AVG}$) measured on a particular link over a time span W in the recent past, and the instantaneous CQI ($CQI_{INST}$) measured using the reference signals over the last time span of M. If the drop in CQI ($CQIAVG-CQI_{INST}$) remains larger than some threshold D for a particular time to trigger (TTT), the CR node may generate an Event A.

The values of D, M, TTT, and W may be entirely dictated by the DSM through the Event A configuration (RRC) message. This message, which may be transmitted in a unicast fashion on the distinct control channel prior to and during link establishment, may carry these parameters and allow the DSM to dynamically change them in order to optimize the spectrum utilization. In particular, the DSM could change these values based on the following probability requirements, which are easily monitored using past statistical results.

The first probability requirement is the probability of triggering Event A when a primary user arrives on a band currently utilized by a CR node and should be greater than x %. The second requirement is the probability of triggering Event A when a primary user arrives on a band neighboring the band utilized by a CR node and should be greater than y %. The third is the false alarm probability of triggering Event A when no primary user arrival occurs and should be below z %.

The value of x should be selected as close to 100% as possible, while the value of z may be as close as possible to 0%. The value of y may depend on the frequency of periodic spectrum sensing periods used by the DSM. For instance, a low frequency periodic spectrum sensing period may require y to be relatively large so that available spectrum opportunities, in bands other than those currently utilized by the CR node under the DSM management area, may be tracked by the DSM using asynchronous silent periods. The number of CR nodes in the management area may also be a factor that may determine the value of y.

Triggered Event A's may be transmitted to the DSM through the distinct control channel via event reports. Once the DSM receives an Event A from a CR node within its management area, it may transmit out a Silent Period Start Control Message on the distinct control channel to schedule an asynchronous silent period.

In order to improve the robustness of the system and reduce the latency in signaling of the silent period, the control messages could be transmitted on a control channel which may be on a distinct frequency from the normal data that is transmitted between the DSM and the CR nodes. The control channel consists of wireless channels residing on a dedicated frequency utilized by the CR network. This frequency may be reserved for the CR network, or may be shared with other primary users. In the later case, multiple possible frequencies can be defined for the control channels and an underlay approach, where control channel information is transmitted at low power, may be used if all possible frequencies are occupied.

As an example, the DSM functionality may reside in an 802.11 AP with multiple frequency channel functionality. The distinct control channel may continue to use an 802.11-based MAC/PHY, but for transmission of only management frames and data required for Silent Period Control Messages and other spectrum sensing related information. An upper MAC layer introduced on top of the MAC sublayer may be introduced in order to route Silent Period Control Messages onto the 802.11-based control channel, while any other messages from the upper layer are routed over the data channel.

Another option for the distinct control channel may be where the control messages described are replaced by a PHY-layer control channel instead. This assumes the presence of a synchronization channel which may synchronize all CR nodes to a common time base. A downlink channel may be used for communicating control information from the DSM to the CR nodes. An uplink control channel may be used for transmitting spectrum sensing results and events from the CR nodes to the DSM.

Figure 16:
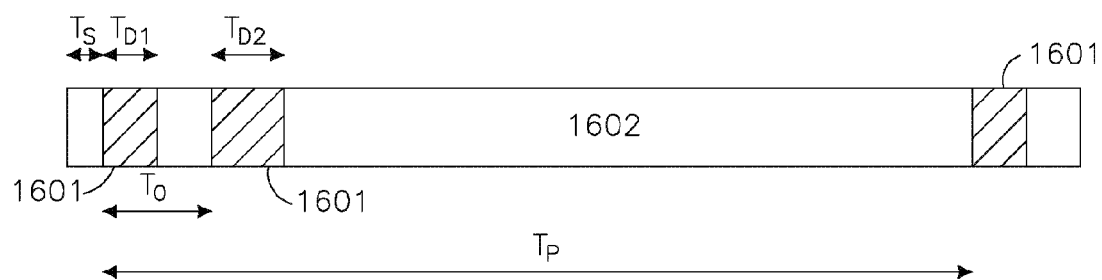
FIG. 16 shows an example of CR node activity on licensed bands with periodic spectrum sensing times.

In steady state operation, silent periods occur periodically and sporadically and are interspaced with periods where the CR nodes may perform regular TX and RX operations. The duration and frequency of occurrence of the silent periods may be controlled by the DSM and communicated to all the CR nodes using a special field in the downlink control channel periodic spectrum sensing control message (PSCM). All CR nodes may know when to read the downlink control channel to receive PSCM, as the timing of messages on the downlink control channel for all CR nodes is established through the synchronization channel. The following quantities may be read from the PSCM as illustrated in FIG. 16: $T_P$, $T_S$, $T_O$, $T_{D1}$, and $T_{D2}$. $T_P$ is the repetition period in frames of the silent period pattern. $T_S$ is the starting frame, relative to frame 0 in a mod N frame numbering scheme, of the first silent period of the silent period patter. To is the offset between the first and second silent period in the silent period pattern. $T_{D1}$ and $T_{D2}$ are the duration of the silent periods 1601 in the pattern. The remaining time 1602 the CR nodes may perform regular TX/RX operations.

Figure 17:
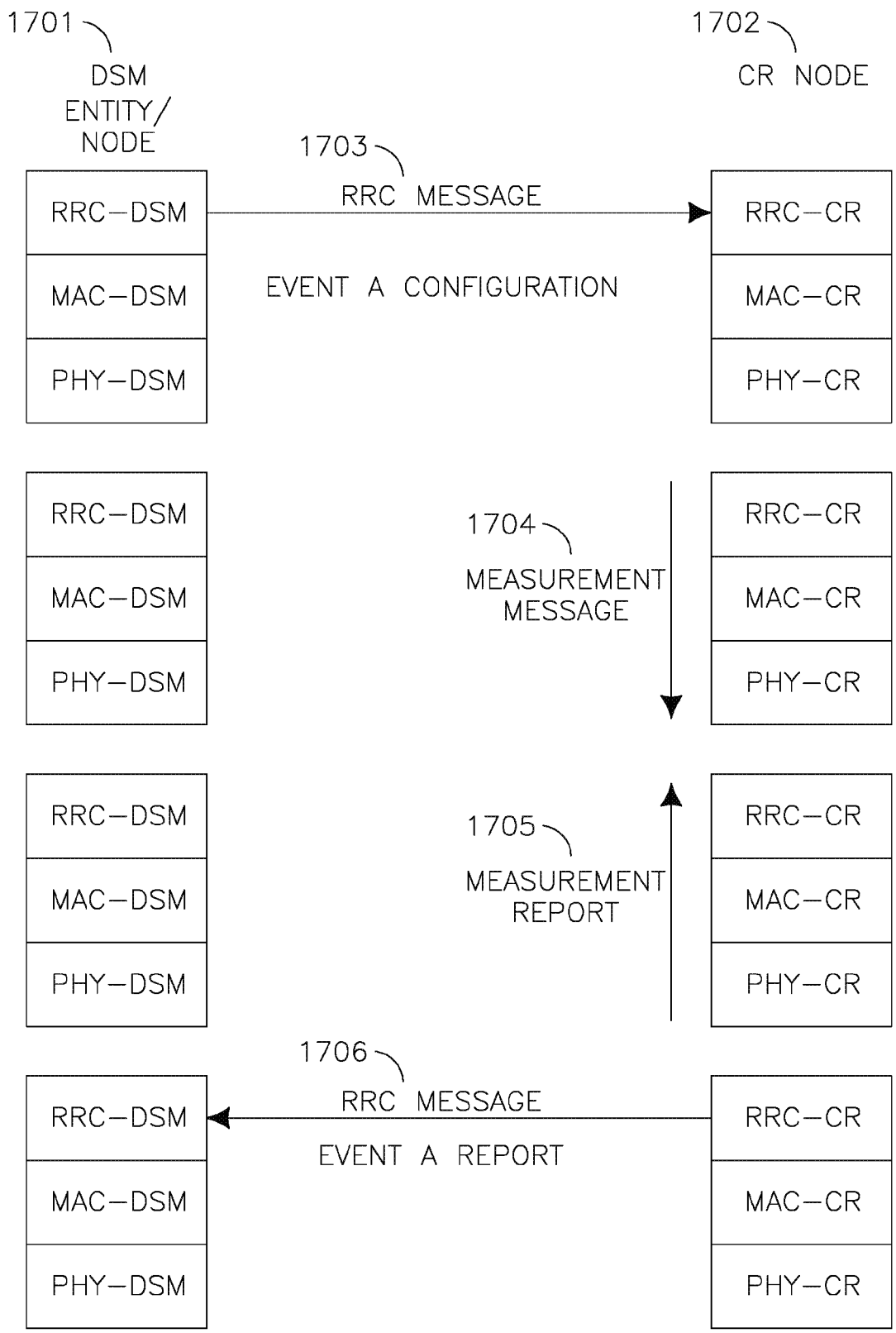
FIG. 17 shows an example of event configuration and reporting in RRC between DSM and CR for PHY-layer CQI measurements.

For a cellular-type system, (and similarly for a WiFi-based system), event configurations and event reports may be handled by the RRC layers of the DSM 1701 and the CR node 1702 respectively, with help of the PHY layer to provide the measurement associated with the event as illustrated in FIG. 17. The RRC-DSM 1701 may transmit an event configuration message 1703 to each of the RRC-CR 1702 to configure the event to be monitored by the CR node 1702 during its active link with another CR node 1702. Events can also be monitored by CR nodes 1702 which are not actively in a link connection, depending on the type of measurement associated with the event. The event configuration message may be transmitted through the downlink control channel to each CR node 1702 involved in event monitoring. The PHY layer of the CR node 1702 will then be instructed to monitor the PHY layer quantity 1704 related to the configured event using a measurement message, between RRC and PHY on the CR node 1702. The event configuration message requests monitoring of the channel quality associated with a link. The PHY layer of all CR nodes 1702 in an active link connection that may have received the event configuration message may periodically transmit channel quality measurements 1705 to its RRC-CR which may further process or filter them based on event configuration. Filtering is performed in order to avoid frequent event triggering and unnecessary spectrum sensing periods. This may be achieved by the introduction of a Time-to-Trigger (TTT), in which the channel quality may be below a certain amount for a minimum amount of time (TTT) in order for the event to be triggered by the RRC filtering logic. Once the event is triggered, the RRC-CR 1702 transmits an event report 1706 to the RRC-DSM 1701 to notify the DSM 1701 of the occurrence of the event and the CR node 1702 where the event occurred. This is shown in FIG. 17, where the measurements in this case are PHY-layer CQI measurements.

FIG. 17 illustrates the RRC signaling and RRC-PHY layer interaction required for configuring and reporting a DSM-related event in the case where PHY-layer measurements are being made for channel quality. Without loss of generality, Event A is triggered where the measured channel quality of a link between two CR nodes drops by a certain amount relative to its long-term average, and the measurements transmitted from the PHY to the RRC entity may be PHY-layer channel quality indicator (CQI) measurements.

Considering the direct link or channel between two communicating CR nodes, for the purposes of CQI measurement, each transmitting CR node may embed known fixed power reference signals into the data channel. The receiving CR node may use these known reference signals to determine the CQI of the data link used by the transmitting CR node. This same set of reference signals may be transmitted by every CR node that has an active link with another node, thus giving the CR node network as a whole the knowledge of the channel quality of all licensed bands actively used by CR nodes. A different reference signal may be possible for other PHY, such as CDMA (Code Division Multiple Access), etc.

Figure 18:
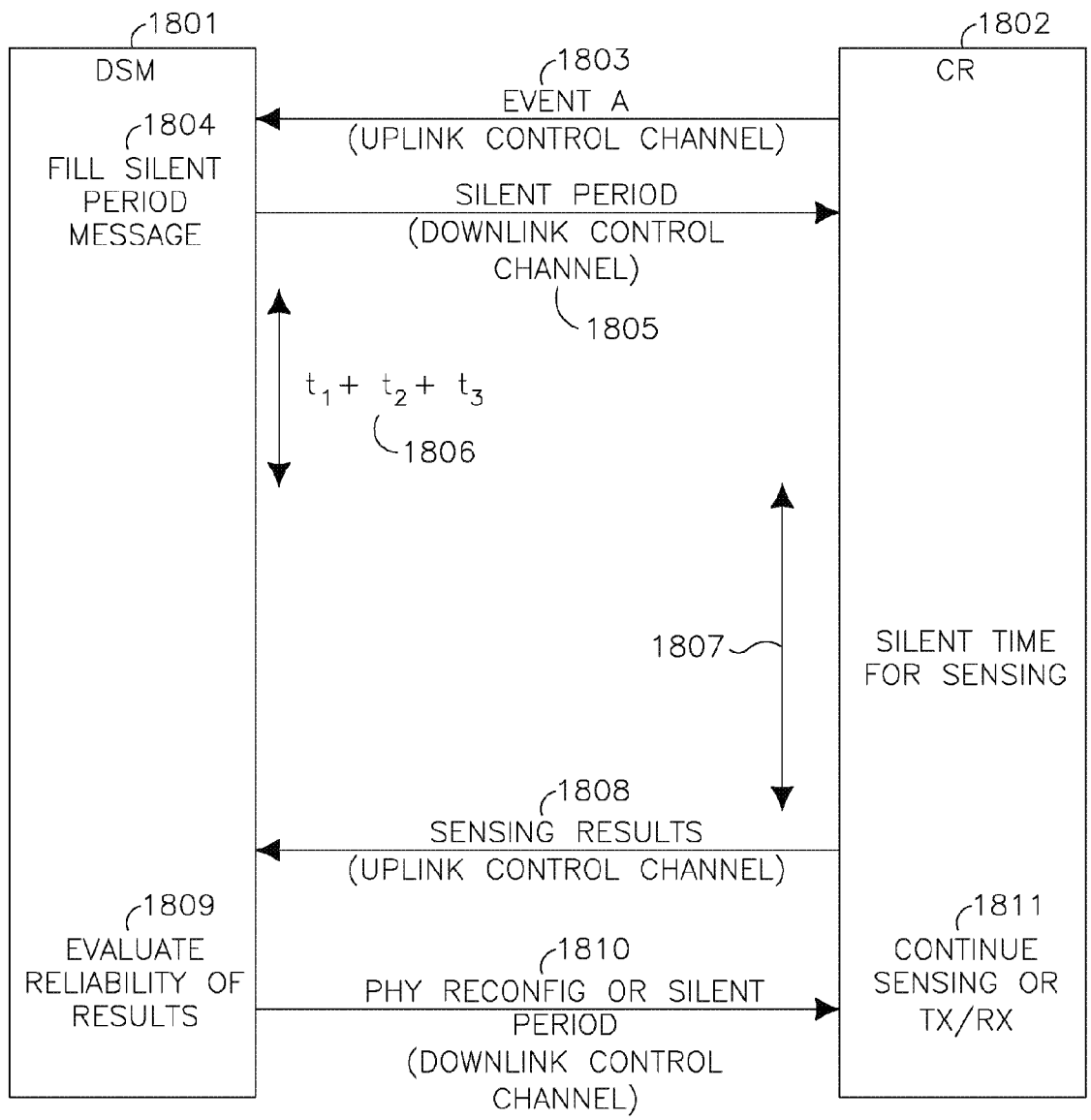
FIG. 18 shows an example of RRC messaging protocol for asynchronous silent period coordination.

In FIG. 18, triggered Event A's may be transmitted to the DSM 1801 through the uplink control channel via event reports (1803). Once the DSM 1801 receives an Event A from a CR node 1802 within its management area, it may transmit out a silent period message on the downlink control channel to schedule an asynchronous silent period at a specific time and for a specific duration, specified in the message itself (1804). The start of the silent period may occur after any of the following delays: $t_1$, $t_2$, $t_3$. A propagation delay ($t_1$) to the furthest node in the management area of the DSM may be determined through messaging on the downlink and uplink control channels. A required delay ($t_2$) for a CR node to become quiet may include the delay required to clear PHY buffers. A quieting period ($t_3$) for a data transmission may be transmitted by a CR node just prior to receiving the silent period message.

The start of the silent time may be scheduled at least $t_1+t_2+t_3$ after the transmitting of the silent period message (1805). In addition to this information, the silent period message may contain a field which indicates the behavior that the CR nodes 1802 may take after they transmit their spectrum sensing results. The CR node 1802 may perform spectrum sensing over the required silent time (1807). The CR node 1802 may transmit spectrum sensing results, through the uplink control channel, to the DSM 1801 (1808). The DSM 1801 may evaluate the reliability of the spectrum sensing results (1809). The DSM 1801 may transmit a PHY reconfiguration or silent period message on the downlink control channel (1810). Two possible behaviors may be expected (1811). First, the CR nodes 1802 may be asked to continue spectrum sensing in order to further refine the results transmitted to the DSM 1801, in which case the silent period may be implicitly extended until the next message is received by the DSM 1801. Second, the CR node 1802 may be asked to continue the previously interrupted TX/RX operation until the DSM 1801 commands another silent period, or reconfigures any CR nodes 1802 to a different frequency based on the spectrum sensing results.

The system under consideration may be a widely distributed set of CR nodes in a centralized network with multiple central controllers. Every CR node may be associated with one central controller. In such a network, it may be reasonable to assume a dedicated synchronization channel may ensure that all nodes may be slot synchronized with the central controller similar to any slotted Aloha system. It may be assumed that all nodes may be slot synchronized, but may not necessarily be frame synchronized. Additionally, it may be assumed that any pair of nodes actively communicating with each other, called an active pair, may be necessarily frame synchronized.

Moreover, all active pairs may have synchronized quiet periods, that is, both nodes of the active pair may use exactly the same slot(s) within a frame to remain quiet and sense the spectrum. But if there may be N such active pairs, the quiet slot(s) for all the pairs may overlap in time since they are not frame synchronized. Random quiet period within each frame may be used to address the need for having all active pairs of nodes remain quiet simultaneously. A DSM may have knowledge of the quiet period schedule of every active pair in the system. Therefore, a synchronized quiet period may be established with a probability of $P_{quiet}$ net across the whole network.

For the method of operation, let M denote the number of slots in each frame, and K denote the number of quiet slots per frame where these K slots may be used to sense the spectrum. It is assumed that the K out of M slots may be chosen randomly in every frame in 1 out of $C_K^M$ ways. However, every active pair of nodes may choose the same K quiet slots and hop to a different pattern every frame in a synchronized fashion. The K quiet slots may be different between any two different active pairs.

Now, there may be a finite probability $P_{quiet}$ for all active nodes to be quiet simultaneously in at least one slot in a frame. This may occur randomly in any frame. For example, if $P_{quiet}=0.3$, it may mean that all active nodes remain quiet simultaneously for at least one slot in 3 out of 10 frames on an average. Thus for a given N active pairs at any time instant, the parameters M and K may be chosen such that the nodes remain quiet for a predefined $P_{quiet}$>x % of the time.

Figure 19:
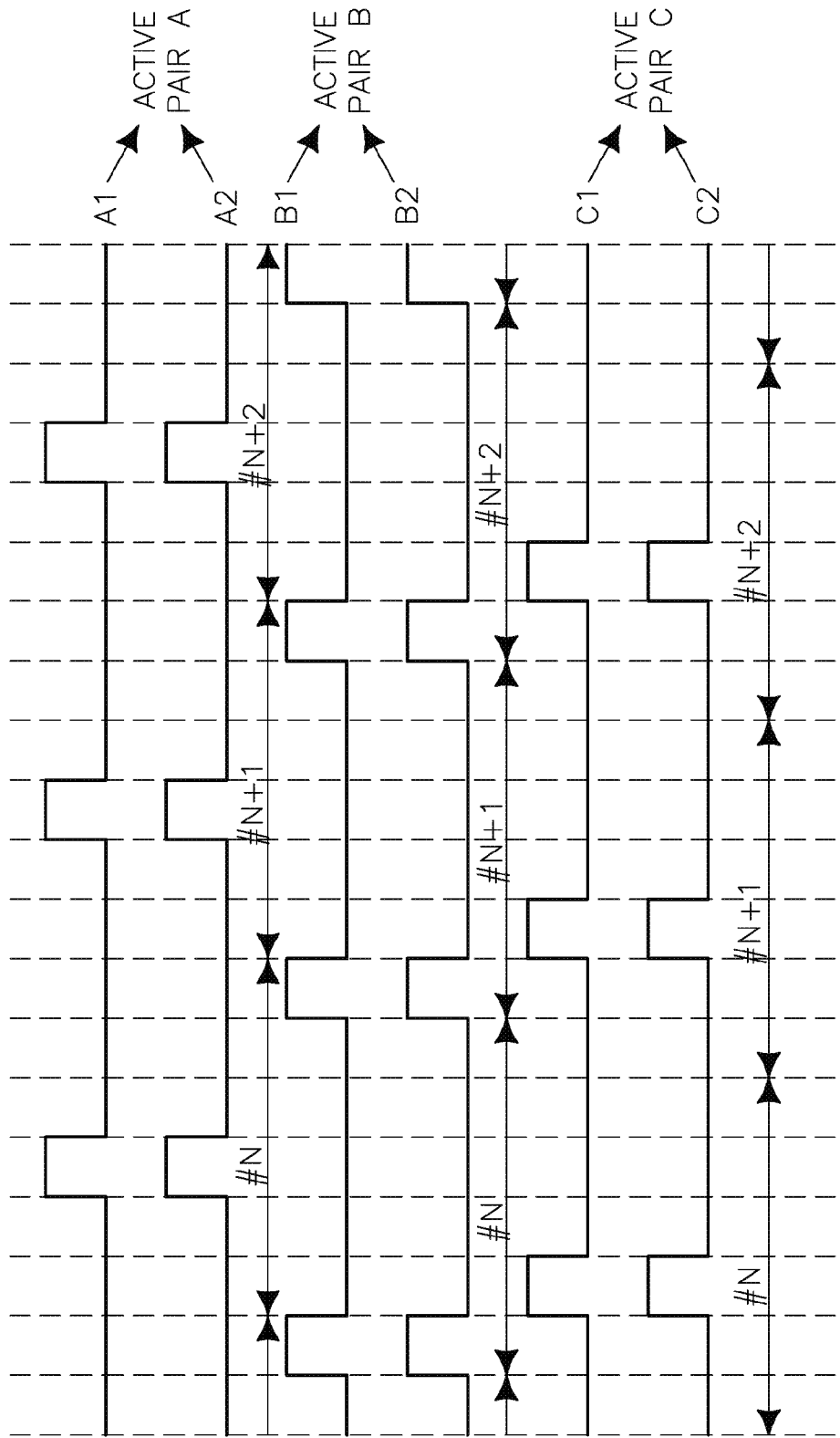
FIG. 19 shows an example of fixed quiet intervals.
Figure 20:
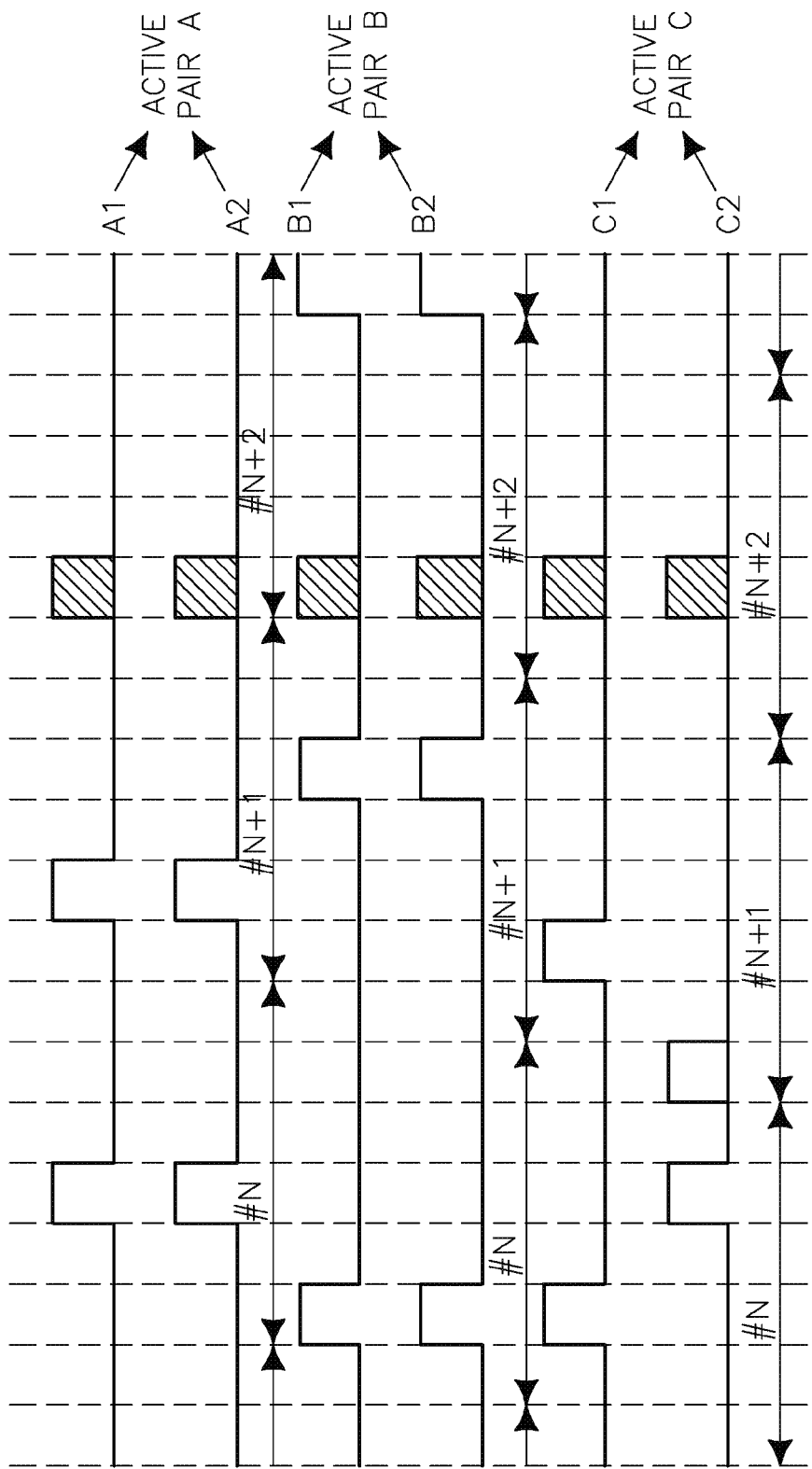
FIG. 20 shows an example of random quiet intervals.

Referring to FIGS. 19 and 20, all the nodes in the network are commonly aware of such boundaries at which dotted vertical lines indicate slot boundaries. The double-headed arrows indicate the frame duration and the frame number. A high in the square wave indicates a quiet period while the low in the square wave indicates transmit/receive activity. In the examples, K=1, M=6 and N=3. In FIG. 19, every active pair of nodes may remain quiet periodically at the same slot number in each frame. That is, active pair A may remain quiet in the third slot of each frame while active pair B may remain quiet in the second slot of each frame. Since the active pairs may not be frame synchronized with each other, the quiet periods of all active pairs may not overlap simultaneously.

In the example shown in FIG. 20, each active pair synchronously may change the quiet time slot randomly to a different location in every frame, That is, active pair A may have a quiet slot at slot #3 of frame #N, at slot #2 on frame #N+1, slot #1 at frame #N. Active pair B may have a quiet slot at slot #2 of frame #N, at slot #4 on frame #N+1, slot #2 at frame #N. Active pair C may have a quiet slot at slot #5 of frame #N, at slot #1 on frame #N+1, slot #3 at frame #N. Due to the random jump of the quiet period from one frame to another, there may be a finite probability of all active nodes to be quiet in the same slot.

Although the examples use K=1 for random quite intervals, one quiet slot may be used in each frame. Increasing the number of quiet slots in a frame may increase the probability of having all nodes being quiet simultaneously over a span of time. But increasing K may reduce the time for communication. Thus, parameters may be chosen appropriately to ensure an optimal tradeoff between spectrum sensing duration and time for communication.

Embodiments

1. A method for use in a Dynamic Spectrum Manager (DSM) for coordinating periodic silent periods in a network, the method comprising:
monitoring bandwidth usage during a predetermined time period 2. The method as embodiment 1, further comprising:
configuring a length and a frequency of a periodic silent period; and
scheduling the periodic silent period at the configured frequency, wherein
the periodic silent period maintains a maximum quality of service (QoS) for a cognitive radio (CR) node in the network.

3. The method as in any one of embodiments 1-2 wherein the DSM is found in an access point (AP).

4. The method as in any one of embodiments 1-2 wherein the DSM is found in a home enhanced Node-B (H(e)NB).

5. A method for use in a Dynamic Spectrum Manager (DSM) for coordinating asynchronous silent periods in a network, the method comprising:
detecting a primary user in the network.

6. The method as in embodiment 5, further comprising:
transmitting a Silent Period Start Control Message to one or more cognitive radio (CR) nodes in the network, wherein the message indicates the start and duration of a silent period and initiates spectrum sensing.

7. The method as in embodiment 6, further comprising:
receiving a Measurement Report Control Message from the one or more CR nodes in the network indicating results of spectrum sensing; and
transmitting a message to the one or more CR nodes, wherein the message instructs the one or more CR nodes to move to a different frequency based on the spectrum sensing results.

8. The method as in any one of embodiments 5-7 wherein the DSM is found in an access point (AP).

9. The method as in any one of embodiments 5-7 wherein the DSM is found in a Home enhanced-Node B (H(e)NBB.

10. The method as in any one of embodiments 8-9 wherein the detecting a primary user in the network is based on a channel quality indicator (CQI) measurement.

11. The method as in embodiment 10 wherein the CQI measurement is a measured channel quality of a link between two CR nodes.

12. A method for use in one or more Cognitive Radio (CR) node for coordinating asynchronous silent periods, the method comprising:
transmitting a Silent Period Trigger Control Message.

13. The method as in embodiment 12, further comprising:
receiving a Silent Period Start Control Message, wherein the message
indicates the start and duration of a silent period and initiates spectrum sensing.

14. The method as in embodiment 13, further comprising:
transmitting a Measurement Report Control Message indicating results of
spectrum sensing; and
receiving a message from the DSM, wherein the message instructs the
one or more CR nodes to move to a different frequency based on the spectrum sensing results.

15. The method as in any one of embodiments 12-14 wherein transmitting the Silent Period Trigger Control Message is based on a change in an environment detected by the CR node.

16. The method as in embodiment 15 wherein the change in the environment is detected by the CR node through a local change in key parameters associated with an active link.

17. The method as in embodiment 16 wherein the key parameters include a channel quality, a link throughput, and a number of retransmissions.

18. The method as in any one of embodiments 13-17 wherein the spectrum sensing is extended for a period of time on a condition that the results of the spectrum sensing fail to detect the primary user.

19. A method for use in a Dynamic Spectrum Manager (DSM) for basic quiet interval scheduling in a Cognitive Radio (CR) node network, the method comprising:
transmitting a quiet interval request to one or more DSMs in the CR node
network.

20. The method as in embodiment 19, further comprising:
receiving a quiet interval response from the one or more DSMs in the
CR node network, wherein the quiet interval request is accepted by a number of the one or more DSMs;
transmitting a quiet interval confirm message to the one or more DSMs in the CR node network.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a Dynamic Spectrum Manager (DSM) for coordinating asynchronous silent periods in a network, the method comprising:
    determining a time-to-trigger (TTT) period for triggering asynchronous sensing events;
    sending the TTT period to a plurality of cognitive radio (CR) nodes in the network;
    receiving an asynchronous sensing event report generated based on the TTT period; and
    sending a silent period control message to one or more CR nodes in the network, wherein the message comprises an indication of a start time of a silent period.

2. The method of claim 1, wherein the TTT period is sent as part of an asynchronous sensing event configuration message that indicates to the CR nodes to measure and monitor a channel quality.

3. The method of claim 2, wherein the asynchronous sensing event configuration message indicates to the CR nodes to send the asynchronous sensing event report on a condition that a drop in the channel quality persists for a time period longer than the TTT period.

4. The method of claim 2, wherein the channel quality comprises a channel quality indicator (CQI).

5. The method of claim 1, wherein the TTT period is determined based on a probability requirement for detecting a primary user.

6. The method of claim 1, further comprising:
    determining a parameter for triggering asynchronous sensing events, the parameter comprises at least one of:
        a channel quality drop threshold,
        a time span for measuring an average channel quality, or
        a time span for measuring an instantaneous channel quality; and
    sending the parameter to the plurality of CR nodes in the network.

7. The method of claim 6, wherein the TTT period and the parameter are sent as part of an asynchronous sensing event configuration message that indicates to the CR nodes to measure and monitor a channel quality, and the asynchronous sensing event configuration message indicates to the CR nodes to send the asynchronous sensing event report on a condition that a drop between the average channel quality and the instantaneous channel quality remains larger than the channel quality drop threshold for a time period longer than the TTT period.

8. The method of claim 1, further comprising:
    determining the start time of the silent period based on at least one of:
        a propagation delay to a furthest node in a management area of the DSM;
        a delay period associated with a CR node to become silent; or
        a quiet period for a data transmission from a CR node.

9. The method of claim 1, wherein the silent period control message comprises an indication of a behavior that the CR nodes are to take upon sending a sensing result.

10. The method of claim 9, wherein the behavior comprises at least one of:
    continuing sensing to further refine the sensing result;
    continuing a transmit operation;
    continuing a receive operation; or
    operating on a different frequency based on the sensing result.

11. A dynamic spectrum manager (DSM) device for coordinating asynchronous silent periods in a network, the device comprising:
    a processor configured to:
        determine a time-to-trigger (TTT) period for triggering asynchronous sensing events;
        send the TTT period to a plurality of cognitive radio (CR) nodes in the network;
        receive an asynchronous sensing event report generated based on the TTT period; and
        in response to the asynchronous sensing event report, send a silent period control message to one or more CR nodes in the network, wherein the message comprises an indication of a start time of a silent period.

12. A method for use in a cognitive radio (CR) node for coordinating asynchronous silent periods, the method comprising:
    determining whether a drop in a channel quality persists for a time period longer than a time-to-trigger (TTT) period;
    on a condition that the drop persists for a time period longer than the TTT period, sending an asynchronous sensing event report;
    receiving a silent period control message that indicates a start time of a silent period; and
    performing spectrum sensing in accordance with the received start time of the silent period.

13. The method of claim 12 further comprising:
    extending the spectrum sensing for a period of time on a condition that the results of the spectrum sensing fail to detect a primary user.

14. The method of claim 12, further comprising:
    receiving the TTT period as part of an asynchronous sensing event configuration message that indicates to the CR node to measure and monitor a channel quality.

15. The method of claim 14, wherein the asynchronous sensing event configuration message indicates to the CR node to send the asynchronous sensing event report on the condition that the drop in the channel quality persists for a time period longer than the TTT period.

16. The method of claim 14, wherein the asynchronous sensing event configuration message comprises a parameter associated with triggering asynchronous sensing events, the parameter comprises at least one of:
    a channel quality drop threshold,
    a time span for measuring an average channel quality, or
    a time span for measuring an instantaneous channel quality.

17. The method of claim 16, wherein the asynchronous sensing event configuration message indicates to the CR node to send the asynchronous sensing event report on a condition that a drop between the average channel quality and the instantaneous channel quality remains larger than the channel quality drop threshold for a time period longer than the TTT period.

18. The method of claim 16, wherein the determining comprises:

determining whether a drop between the average channel quality and the instantaneous channel quality remains larger than the channel quality drop threshold for a time period longer than the TTT period, and wherein the asynchronous sensing event report is sent on a condition that the drop between the average channel quality and the instantaneous channel quality remains larger than the channel quality drop threshold for a time period longer than the TTT period.

19. The method of claim 12, further comprising:
receiving an indication of an action to take upon sending a sensing result; and
taking the action in accordance with the indication.

20. The method of claim 19, wherein the action comprises at least one of:
continuing sensing to further refine the sensing result;
continuing a transmit operation;
continuing a receive operation; or
operating on a different frequency based on the sensing result.

21. A cognitive radio (CR) node for coordinating asynchronous silent periods, the CR node comprises:
a processor configured to:
determine whether a drop in a channel quality persists for a time period longer than a time-to-trigger (TTT) period;
on a condition that the drop persists for a time period longer than the TTT period, send an asynchronous sensing event report;
receive a silent period control message that indicates a start time of a silent period; and
perform spectrum sensing in accordance with the received start time of the silent period.

* * * * *